United States Patent
Liang et al.

(10) Patent No.: US 11,440,431 B2
(45) Date of Patent: Sep. 13, 2022

(54) MANAGING AND MONITORING CAR-BATTERY AND TIRES TO ASSURE SAFE OPERATION AND PROVIDING ARRIVAL READY BATTERY AND TIRE SERVICES

(71) Applicants: Shwu-Jian Liang, Taoyuan (TW); Bo-In Lin, Los Altos Hills, CA (US)

(72) Inventors: Shwu-Jian Liang, Taoyuan (TW); Bo-In Lin, Los Altos Hills, CA (US)

(73) Assignees: Shwu-Jiang Liang, Los Altos Hills, CA (US); Bo-In Lin, Los Altos Hills, CA (US)

( * ) Notice: Subject to any disclaimer, the term of this patent is extended or adjusted under 35 U.S.C. 154(b) by 142 days.

(21) Appl. No.: 16/935,075

(22) Filed: Jul. 21, 2020

(65) Prior Publication Data
US 2020/0376979 A1 Dec. 3, 2020

Related U.S. Application Data

(60) Continuation-in-part of application No. 15/258,952, filed on Sep. 7, 2016, now Pat. No. 10,717,362, which
(Continued)

(51) Int. Cl.
*H01M 10/46* (2006.01)
*B60L 58/12* (2019.01)
(Continued)

(52) U.S. Cl.
CPC ............. *B60L 58/12* (2019.02); *B60L 53/305* (2019.02); *B60L 53/31* (2019.02); *B60L 53/65* (2019.02);
(Continued)

(58) Field of Classification Search
CPC ...... H02J 7/0047; H02J 7/0013; H02J 7/1423; H02J 7/0048; B60L 58/12; B60L 58/16; B60L 53/65; B60L 53/305; B60L 2240/12; B60L 2240/14; B60L 53/31; B60L 53/665; B60L 53/68; B60L 53/80; B60L 58/21; B60L 2240/545; B60L 2240/547;
(Continued)

(56) References Cited

U.S. PATENT DOCUMENTS 10,580,224 B2 * 3/2020 Kurimoto ............... B60L 58/16
10,717,362 B2 * 7/2020 Liang ..................... B60L 53/31
(Continued)

FOREIGN PATENT DOCUMENTS

WO WO-2019181729 A1 * 9/2019 ............ H01M 10/48

*Primary Examiner* — Edward Tso
(74) *Attorney, Agent, or Firm* — Bo-In Lin

(57) ABSTRACT

The present invention discloses a system for managing rechargeable batteries to provide power to electrical vehicles. The system comprises a plurality of charging stations each if the intelligent charger includes at least an intelligent battery charger for charging the rechargeable batteries. The intelligent battery chargers further comprises a battery diagnostic detector for detecting and storing data of designated battery health management parameters. The intelligent battery chargers further comprises a transmitter for transmitting the data of the designated battery health management parameters as wireless signals to a networked server in a battery management center.

11 Claims, 25 Drawing Sheets showing a signal transmission system implemented with cloud computing technologies and intelligent charging system.

Related U.S. Application Data is a division of application No. 13/743,371, filed on Jan. 17, 2013, now abandoned.

(60) Provisional application No. 61/587,466, filed on Jan. 17, 2012.

(51) Int. Cl.
| | |
|---|---|
| *B60L 53/30* | (2019.01) |
| *B60L 53/68* | (2019.01) |
| *B60L 53/31* | (2019.01) |
| *B60L 53/65* | (2019.01) |
| *B60L 58/21* | (2019.01) |
| *B60L 53/80* | (2019.01) |
| *B60L 58/16* | (2019.01) |
| *B60L 53/66* | (2019.01) |
| *G06K 7/10* | (2006.01) |
| *G06K 19/07* | (2006.01) |
| *G06Q 30/06* | (2012.01) |

(52) U.S. Cl.
CPC ............. *B60L 53/665* (2019.02); *B60L 53/68* (2019.02); *B60L 53/80* (2019.02); *B60L 58/16* (2019.02); *B60L 58/21* (2019.02); *G06K 7/10297* (2013.01); *G06K 19/0723* (2013.01); *G06Q 30/0645* (2013.01); *B60L 2240/545* (2013.01); *B60L 2240/547* (2013.01); *B60L 2240/549* (2013.01); *B60L 2240/70* (2013.01); *B60L 2250/10* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ........... B60L 2240/549; B60L 2240/70; B60L 2250/10; Y02T 90/14; Y02T 90/12; Y02T 10/70; Y02T 10/7072; Y02T 90/16; Y02T 90/167; G06K 7/10297; G06K 19/0723; G06Q 30/0645; Y04S 30/14
USPC ..... 320/104, 107, 109, 132, 149; 349/636.1, 349/636.12, 636.13, 636.15
See application file for complete search history.

(56) References Cited

U.S. PATENT DOCUMENTS

| | | | |
|---|---|---|---|
| 2021/0049480 A1* | 2/2021 | Kale | ..................... B60L 58/16 |
| 2021/0094433 A1* | 4/2021 | Badger, II | ............... B60L 53/64 |

* cited by examiner

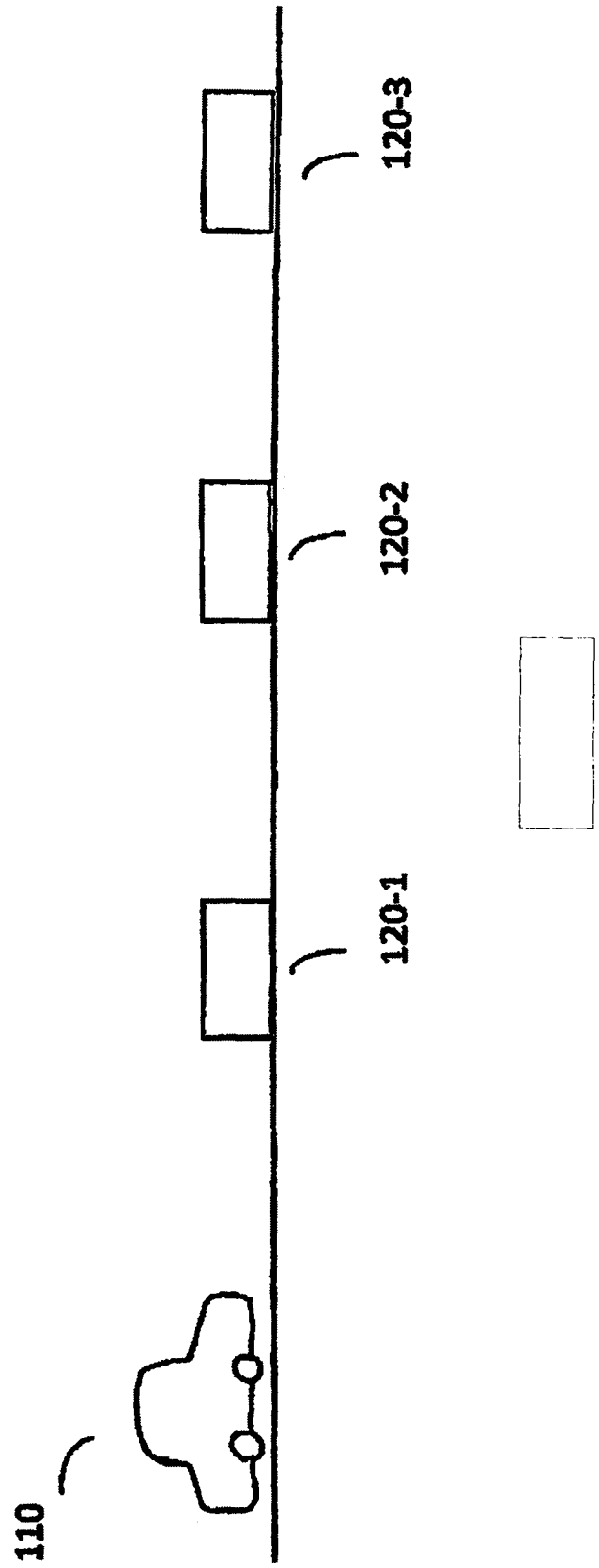
Figure 1. showing a system and method for supplying energy to EPV.
*EPV: Electrically Powered Vehicles

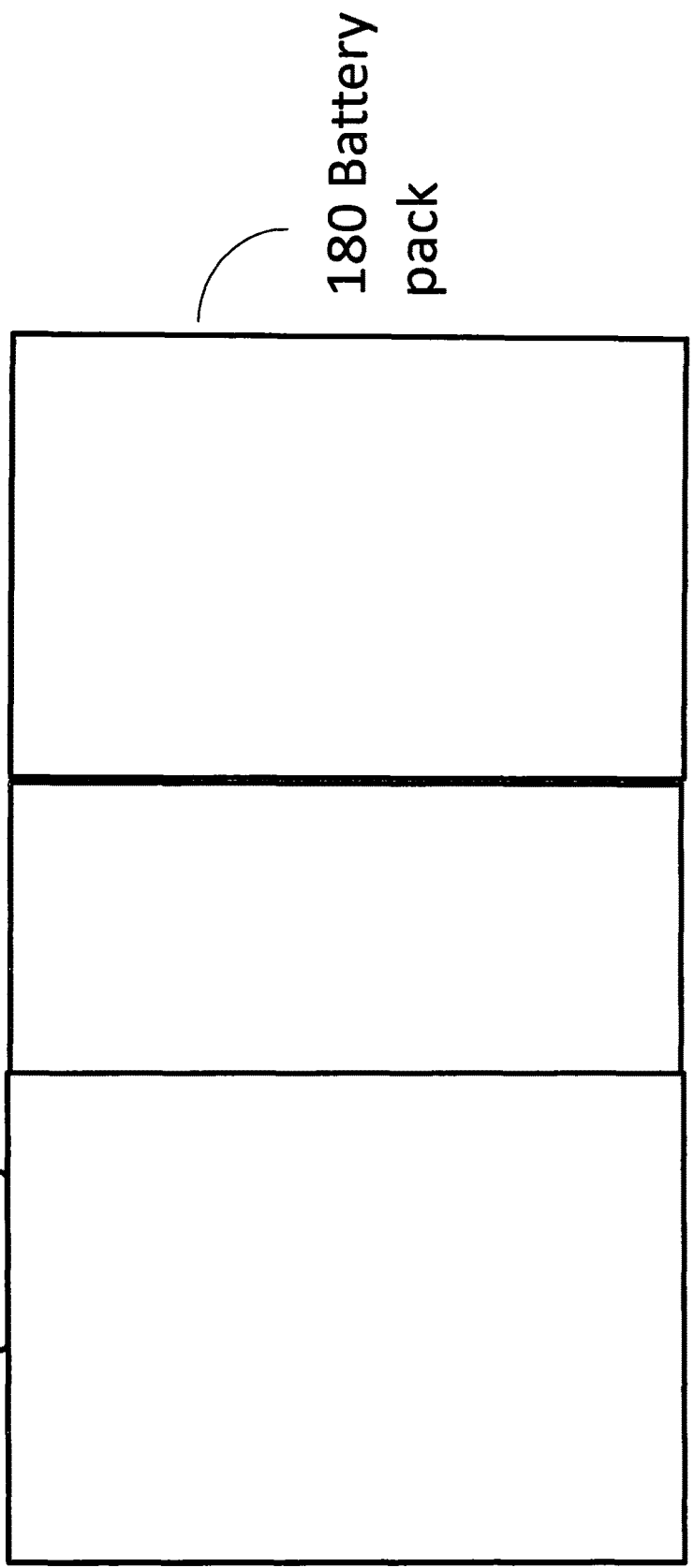
Figure 2. Battery Pack With Battery Management System (BMS).

2 Hardware requirements
Figure 2B. BMS-IC chip 195 of monitoring system.
*BMS: Battery Management System
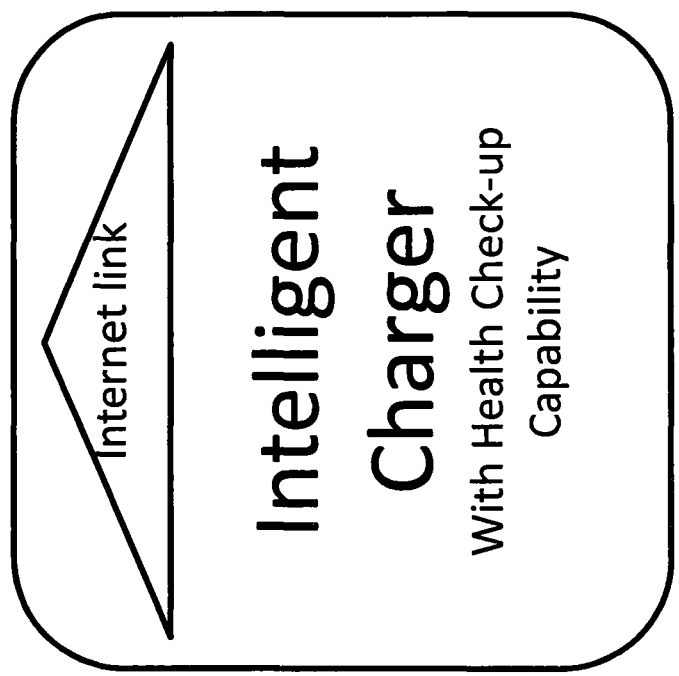
Figure 2C. shows an intelligent charger incorporating a battery health check-up system.

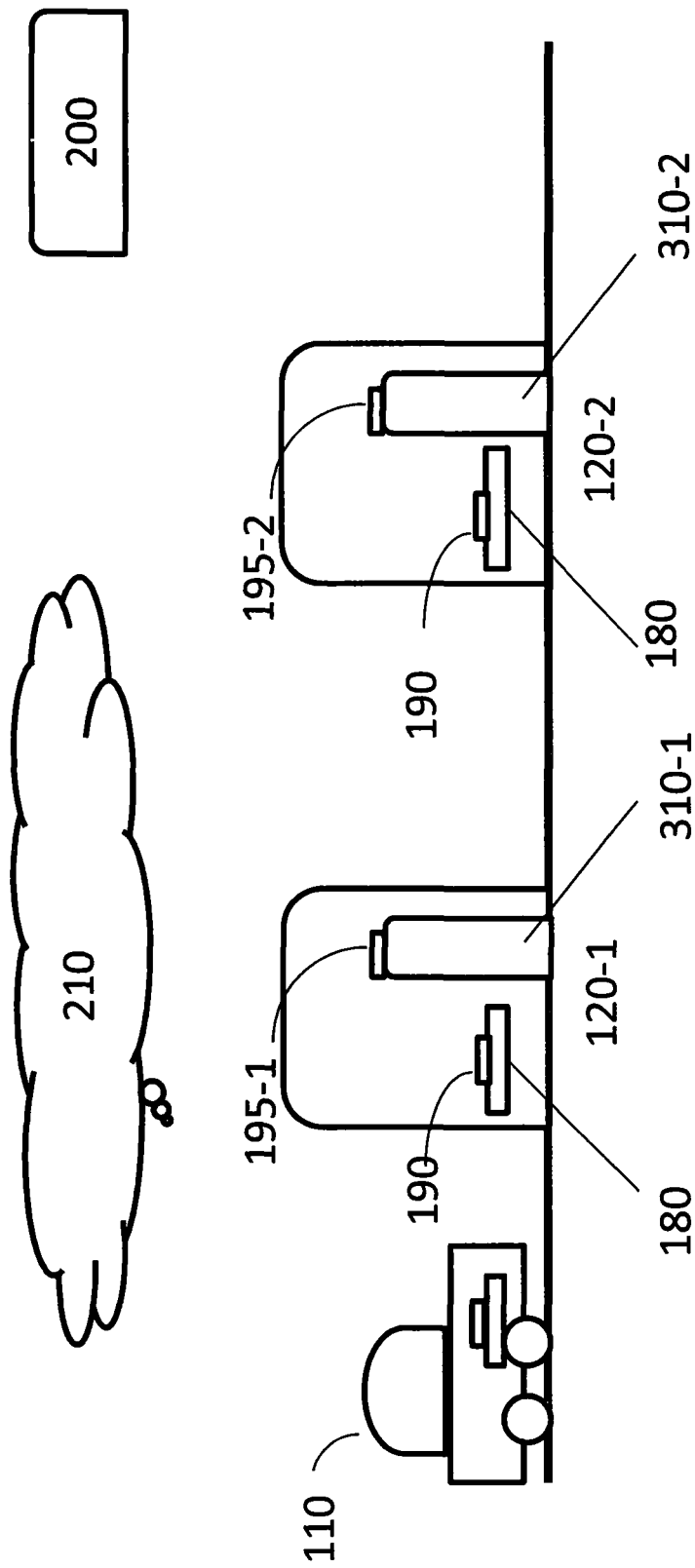
Figure 3. showing a signal transmission system implemented with cloud computing technologies and intelligent charging system.

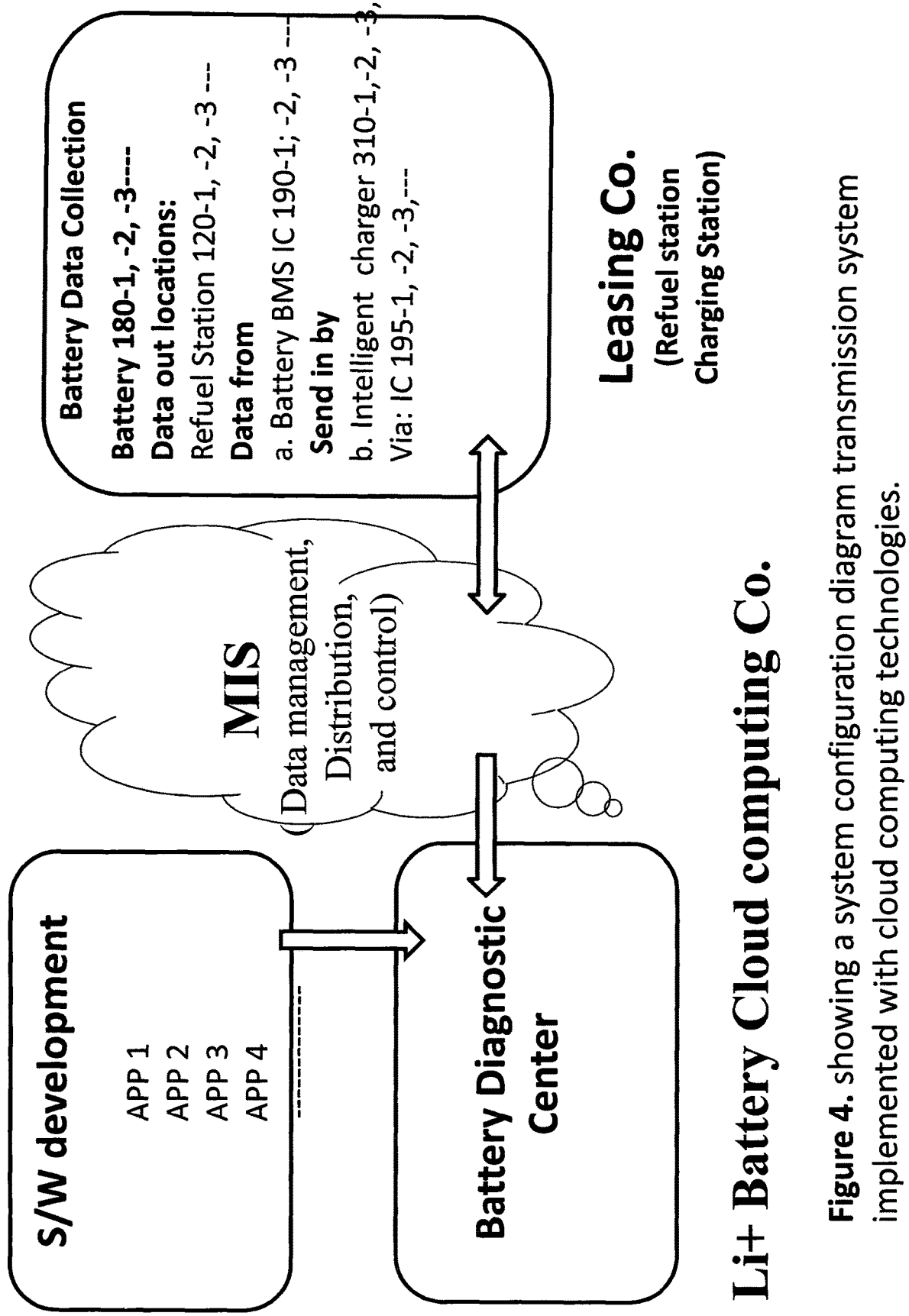
Figure 4. showing a system configuration diagram transmission system implemented with cloud computing technologies.

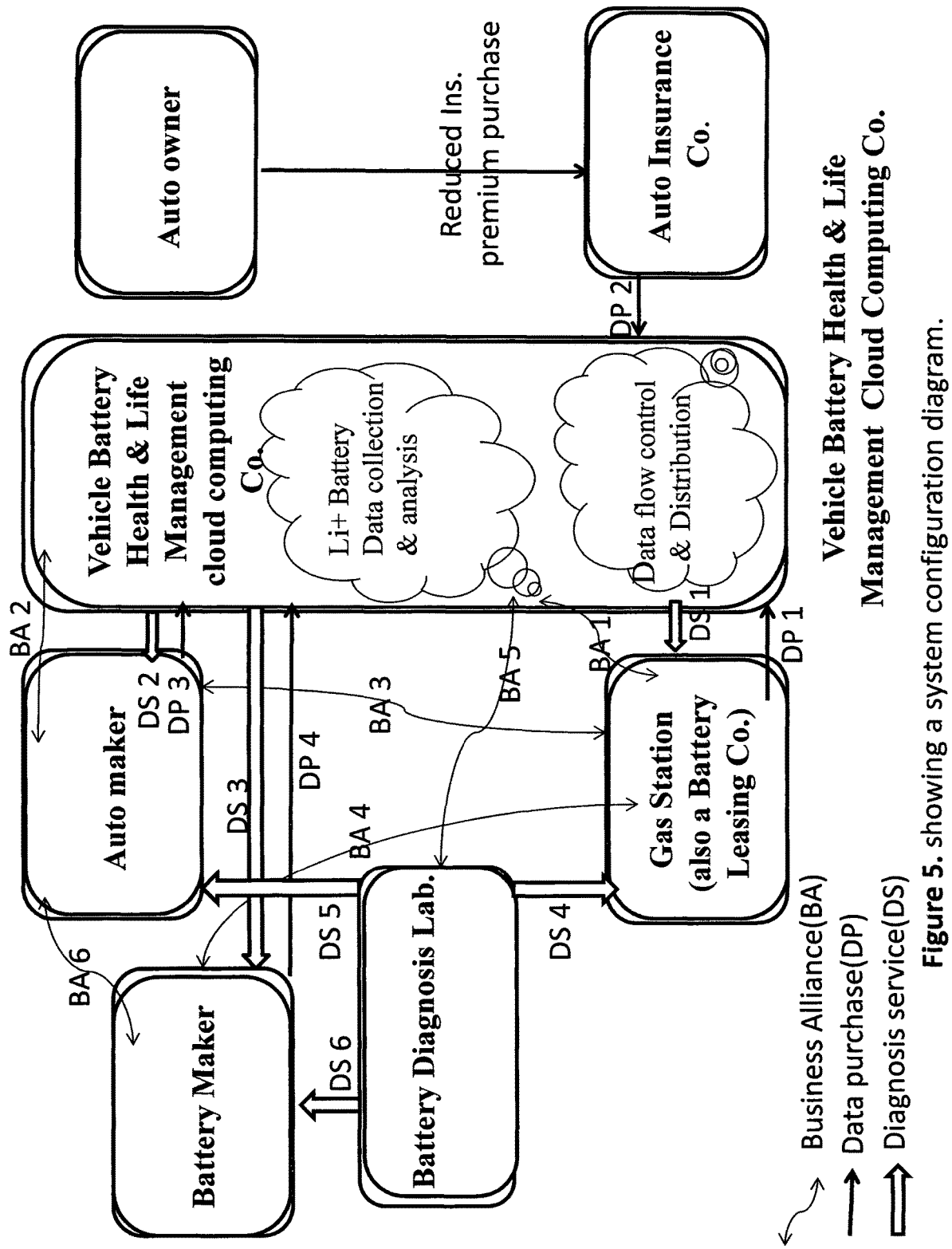
Figure 5. showing a system configuration diagram.

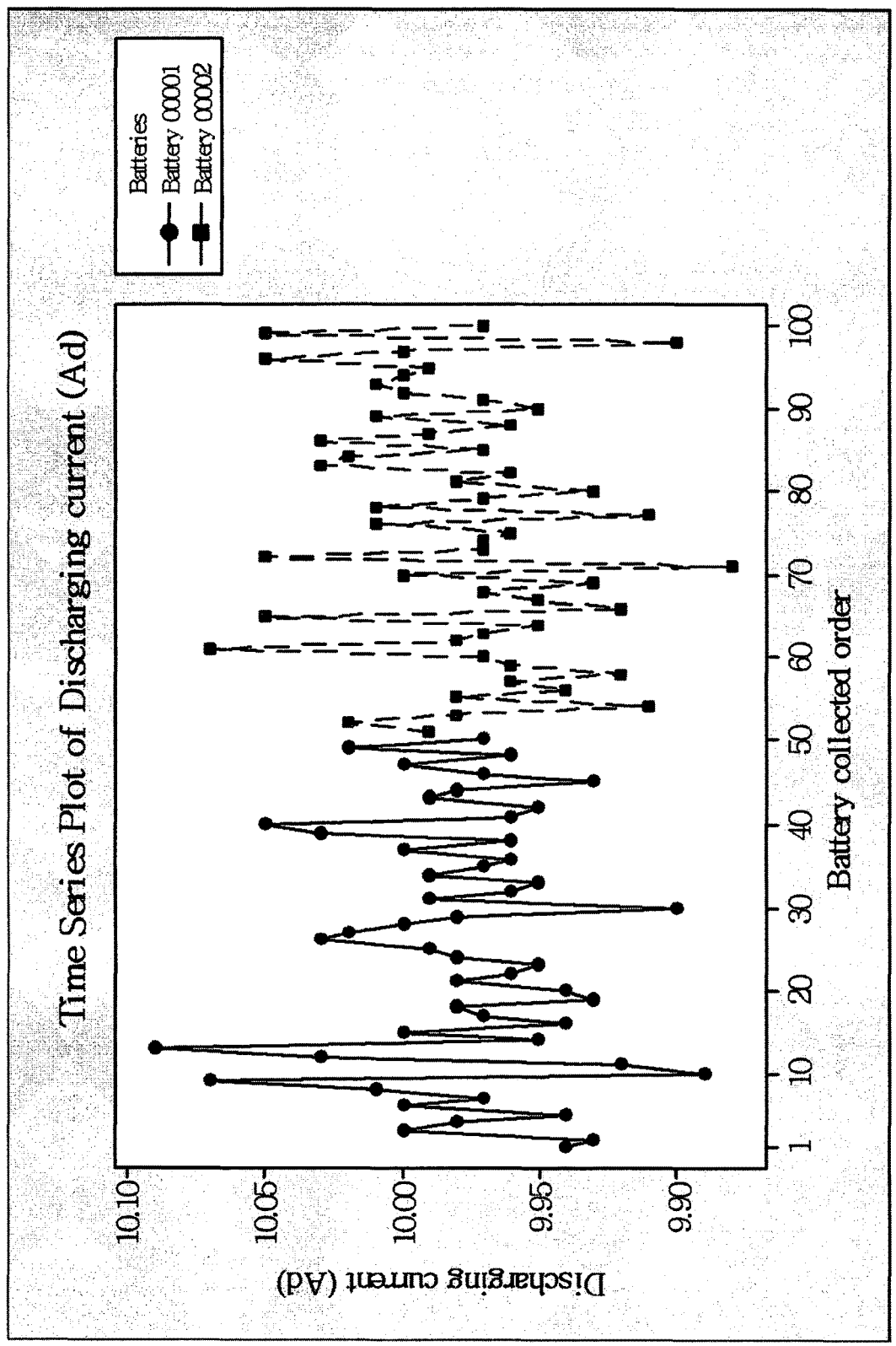
Figure 5-1.1 showing the differentiation of the two batteries.

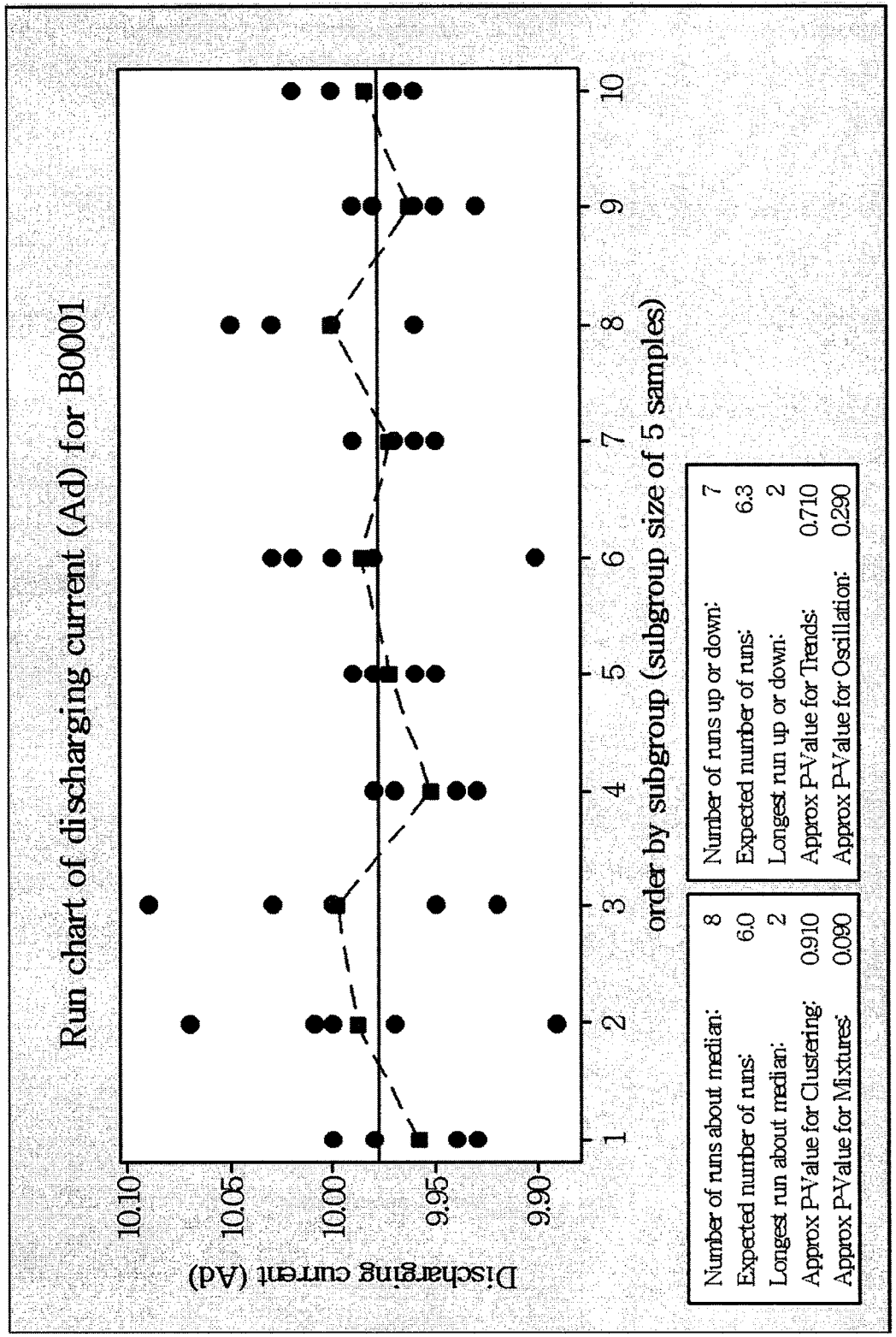
Figure 5-2.1 shows the relationships between order by subgroup and the discharging current by run chart.

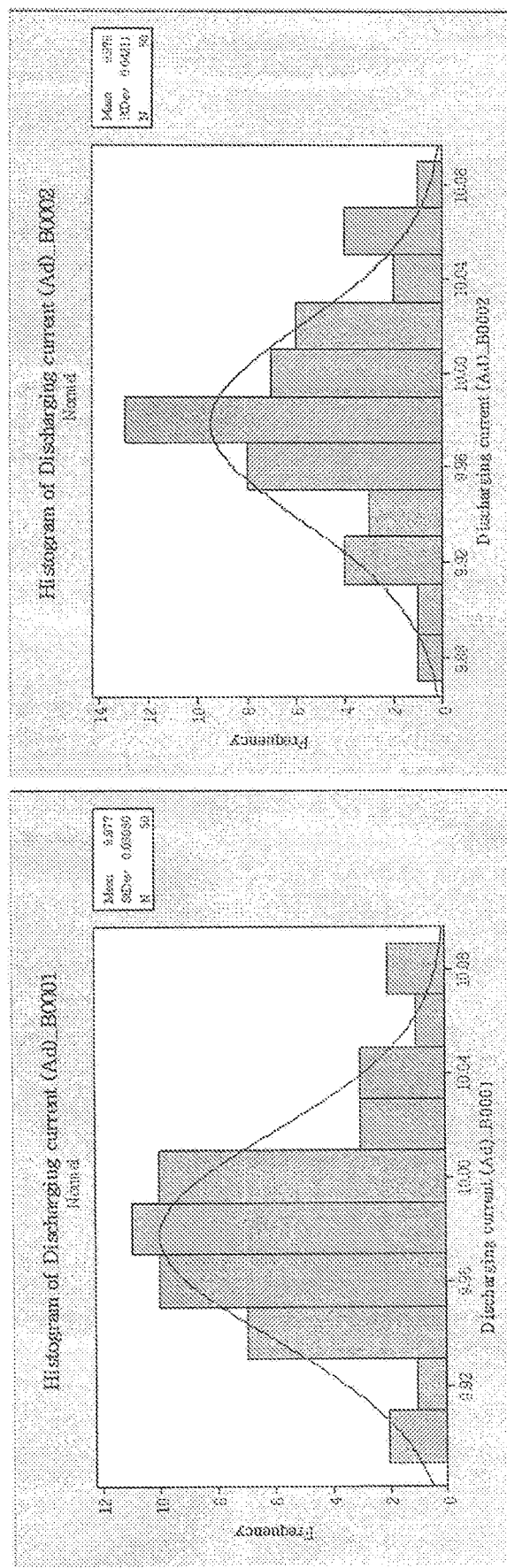
Figure 5-3.1 shows the two kinds of battery distribution of measurements.

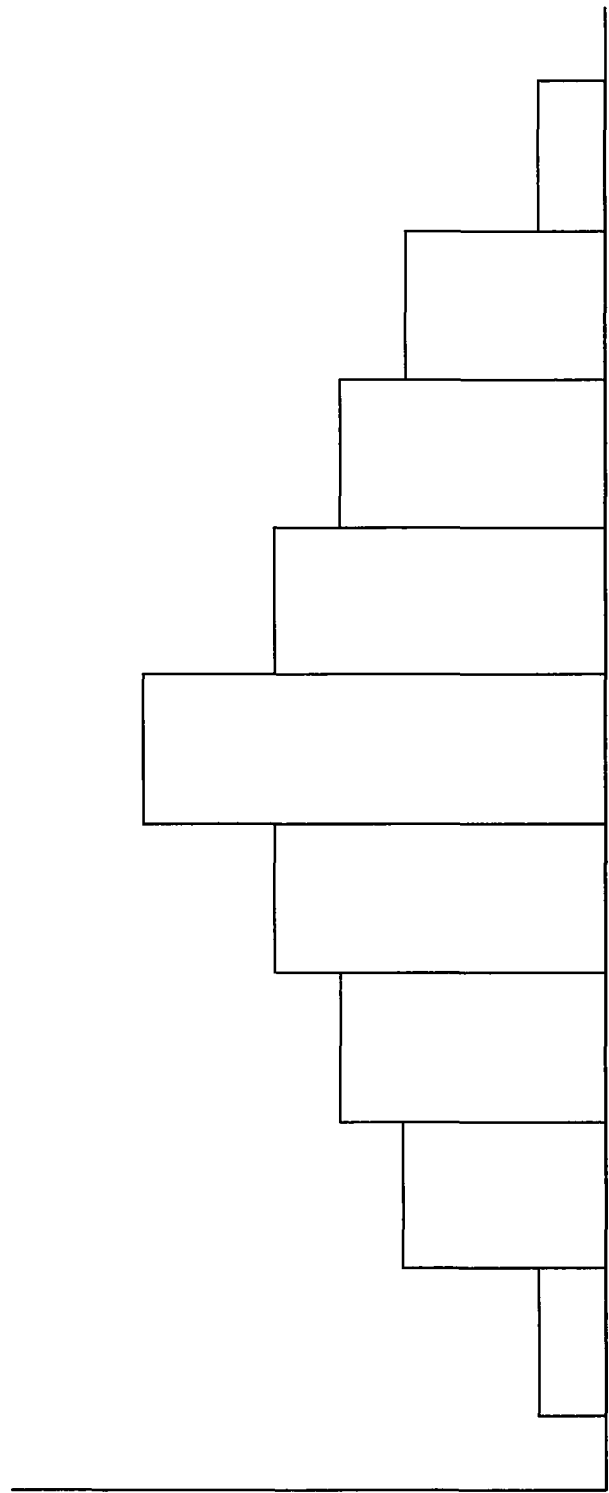
Figure 5-3.2 Normal-distribution shape

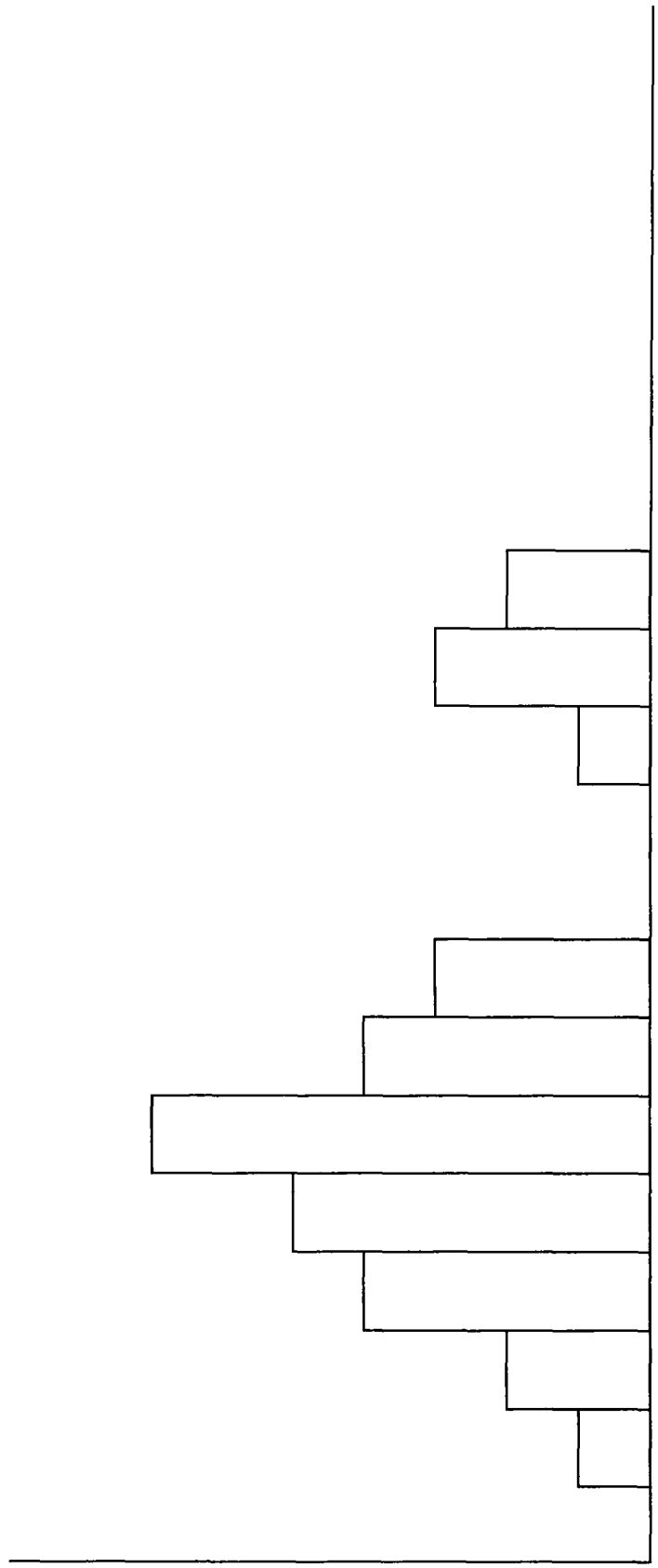
Figure 5-3.3 Isolated-peaked (Edge-peak) shape

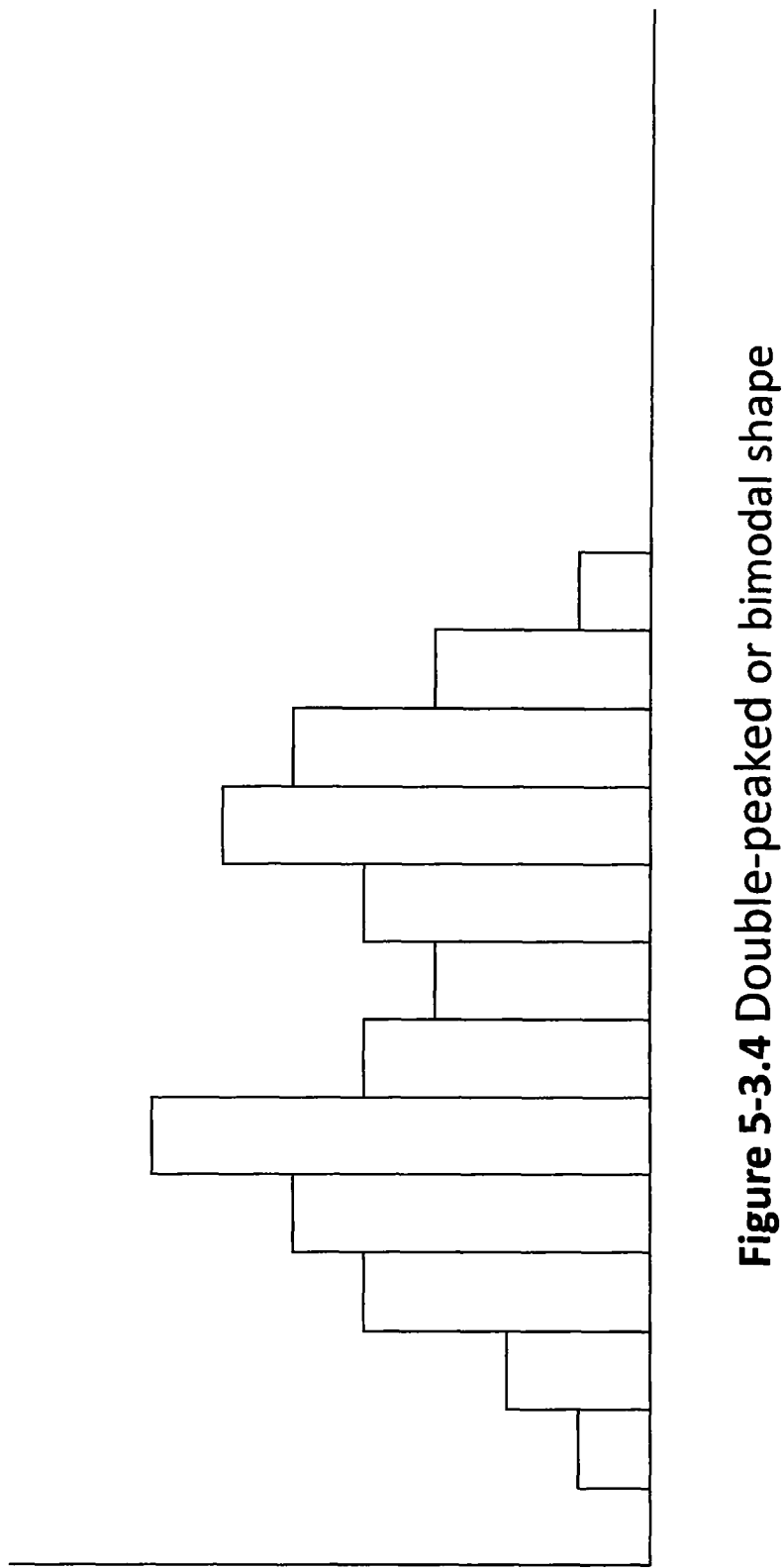
Figure 5-3.4 Double-peaked or bimodal shape

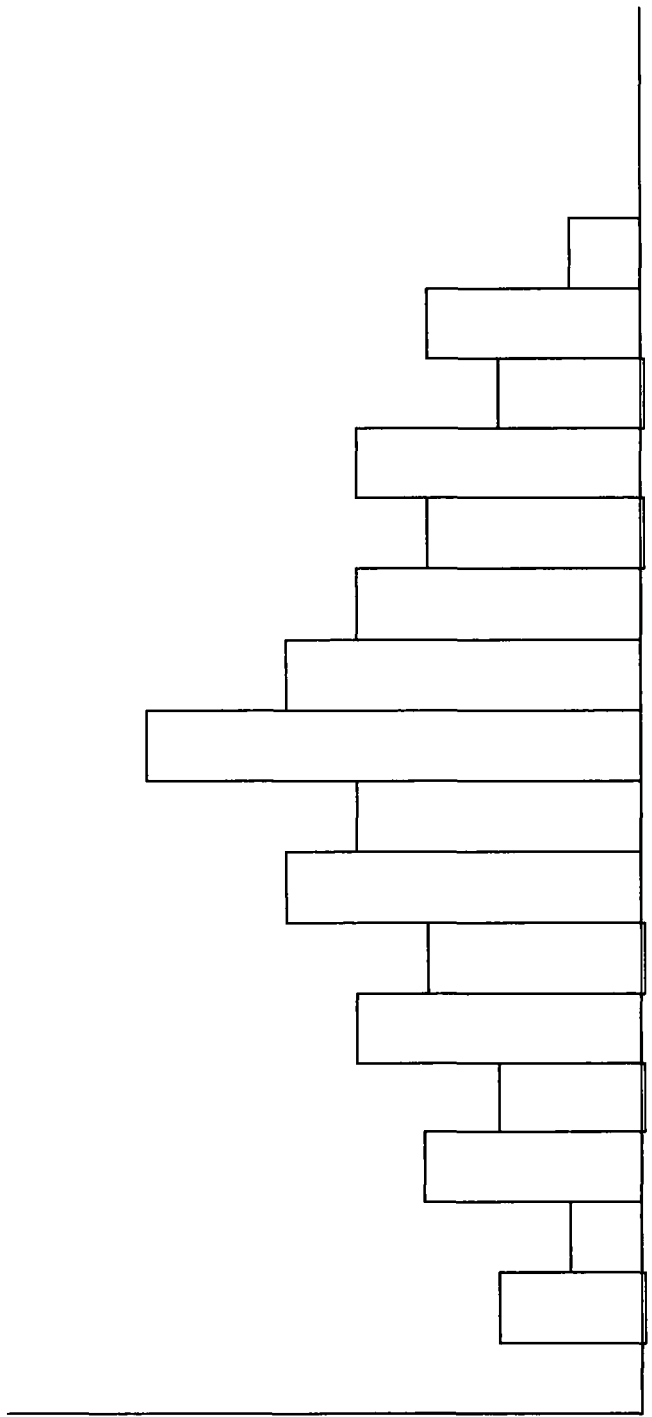
Figure 5-3.5 Cog-toothed (or Combed) shape

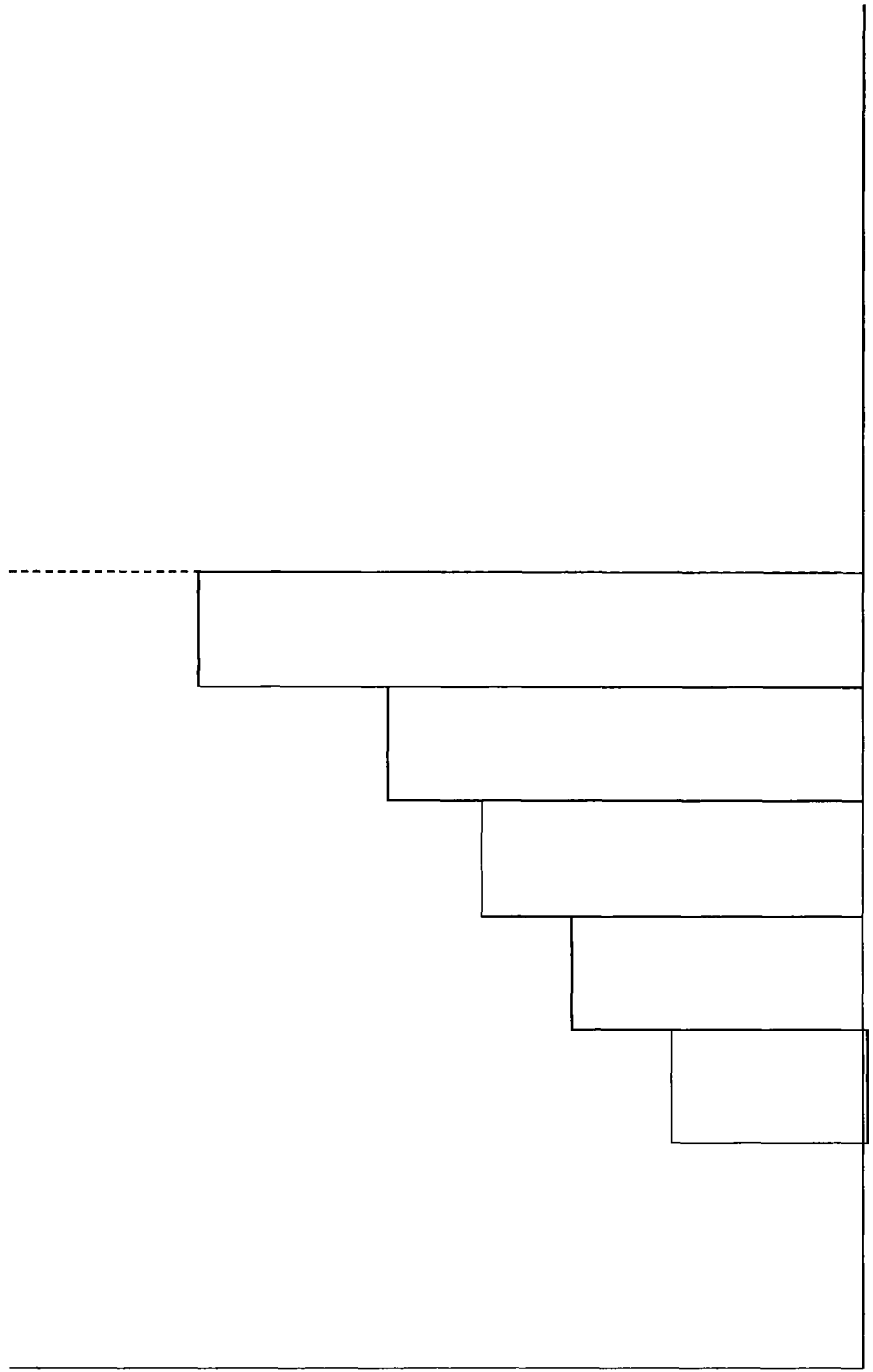
Figure 5-3.6 Truncated (or heart-cut) shape

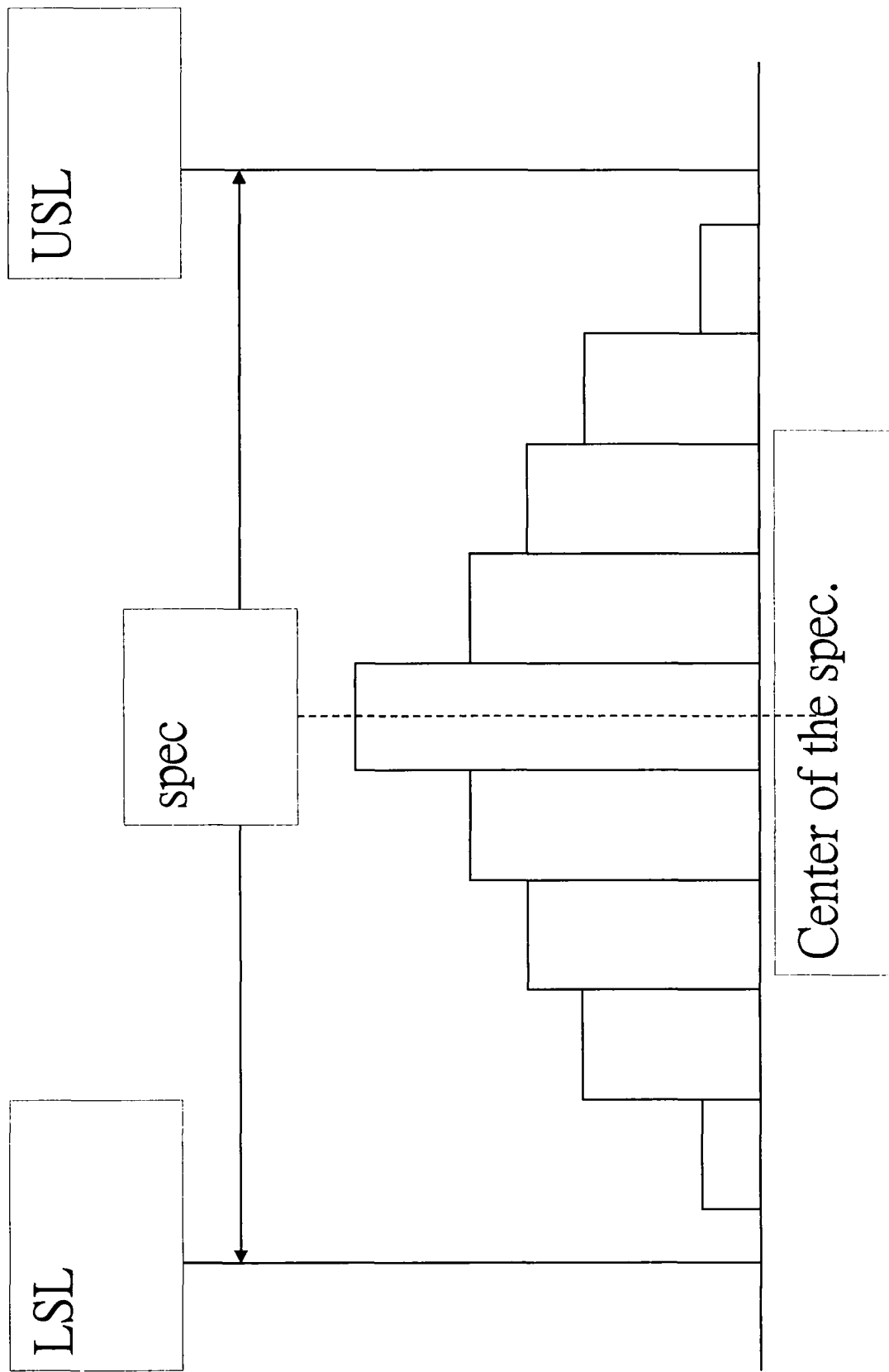
Figure 5-3.7 shows the battery specifications

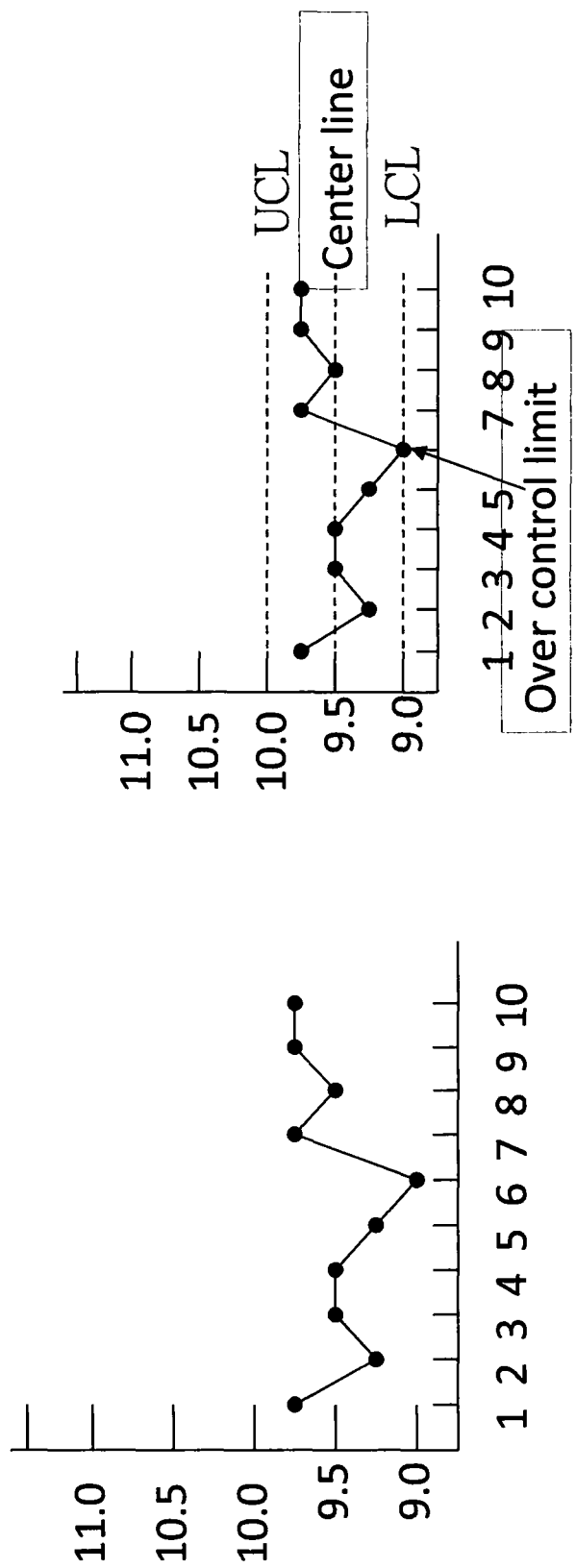
Figure 5-4.1 shows the difference of two charts from run chart to control chart.

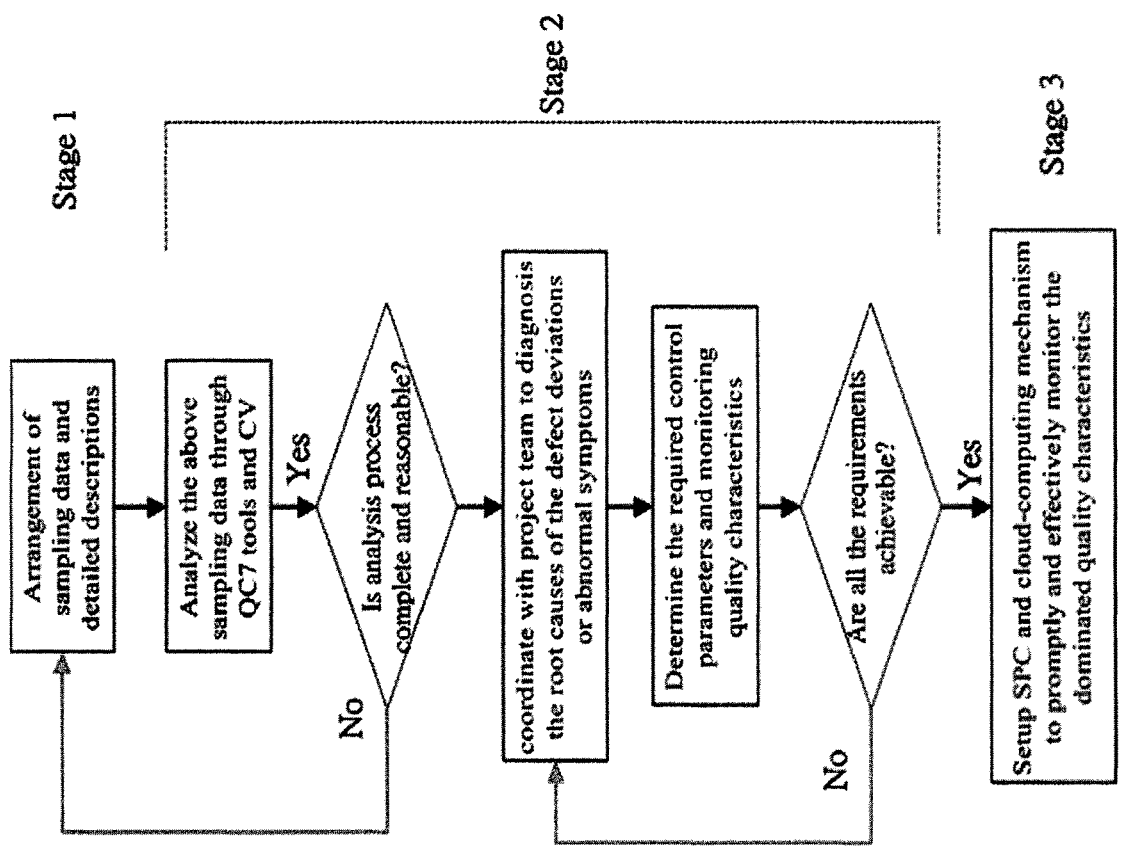
Figure 5-5.1 showing a robust statistical quality control of the Lithium battery.

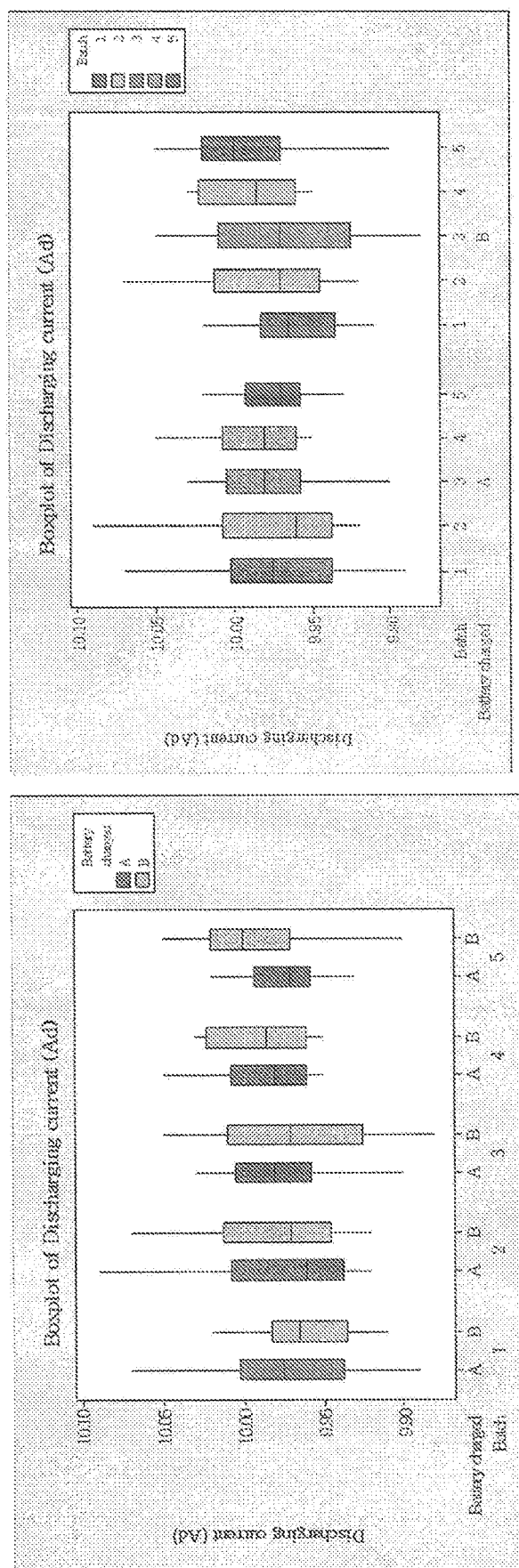
Figure 5-5.2 Box plots of discharging current using multi-dimensional scaling

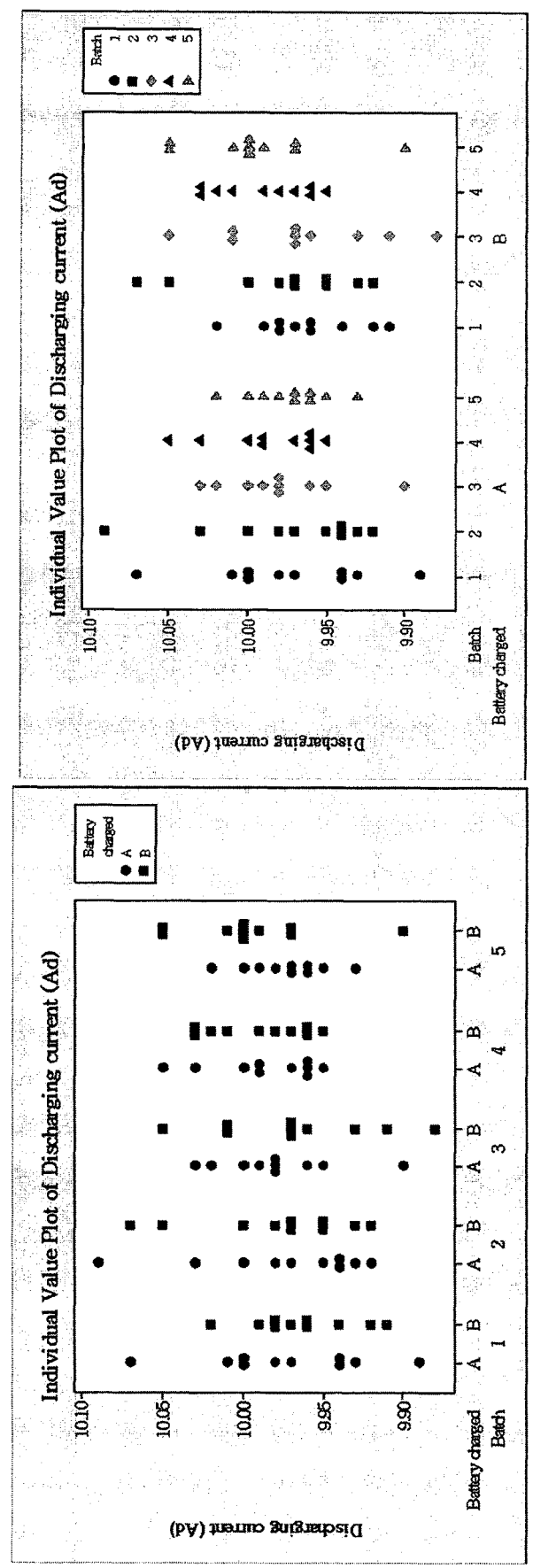
Figure 5-5.3 Individual value plots of discharging current using multi-dimensional scaling

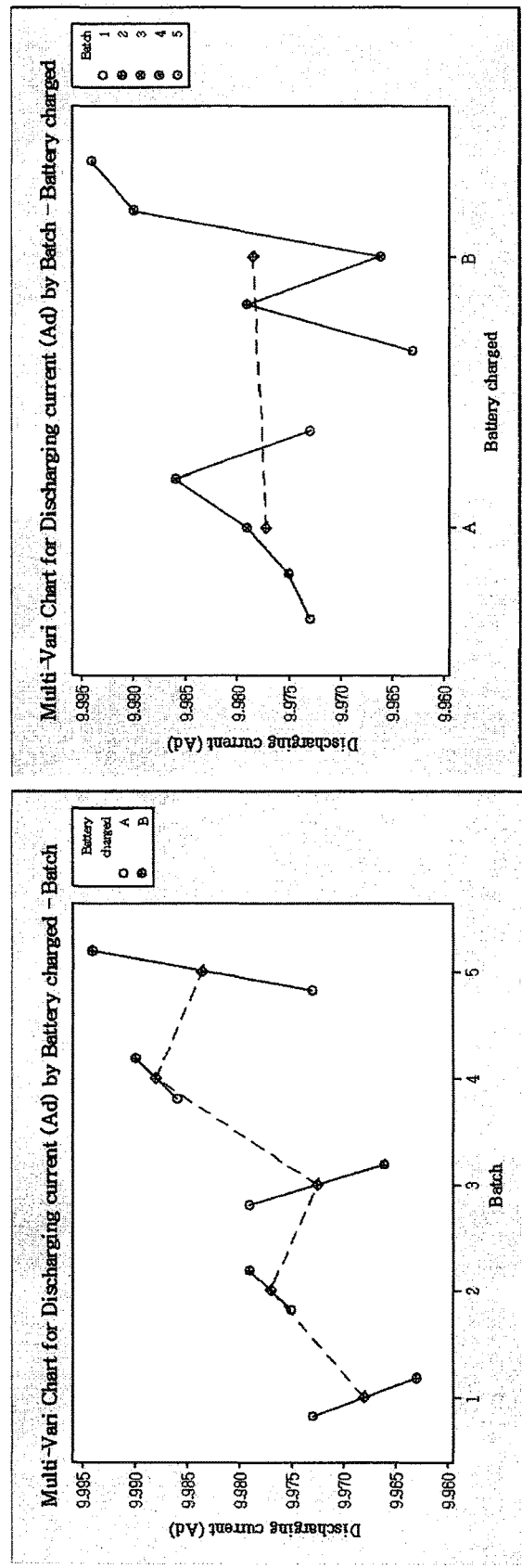
Figure 5-5.4 Multi-vari charts of discharging current using multi-dimensional scaling

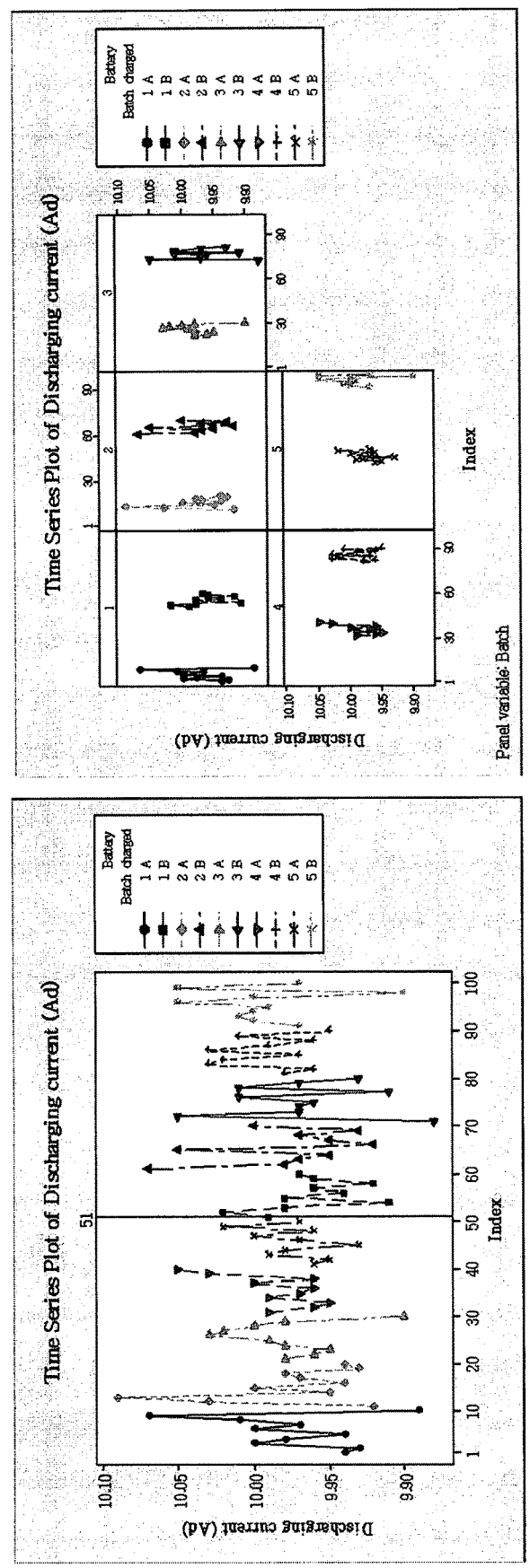
Figure 5-5.5 Time series plot of discharging current using multi-dimensional scaling

MANAGING AND MONITORING CAR-BATTERY AND TIRES TO ASSURE SAFE OPERATION AND PROVIDING ARRIVAL READY BATTERY AND TIRE SERVICES

This Application is a Continuation in Part (CIP) Application of patent application Ser. No. 15/258,852 filed on Sep. 7, 2016 by a co-Inventor of this Application. Application Ser. No. 15/258,952 is a Divisional Application of a previously filed patent application Ser. No. 13/743,371 filed on Jan. 17, 2013. Application Ser. No. 13/743,371 is a Non-Provisional Application based on and claims the Priority of a previously filed Provisional Application 61/587,466 filed by the Applicant of this Application on Jan. 17, 2012. The disclosures made in application Ser. No. 13/743,371 and Ser. No. 61/587,466 are hereby incorporated by reference.

FIELD OF THE INVENTION

The present invention relates to systems, apparatuses and methods for supplying energy to electrically powered vehicles (EPV). More particularly, the invention relates to the systems and methods to manage a process for quickly exchanging batteries and meanwhile implementing cloud-computing network connected battery health monitoring devices to transmit signals whereby continuously monitoring the health state of all the batteries in order to effectively and safely supply energy to the electrically powered vehicles.

BACKGROUND OF THE INVENTION

As there are more electrically powered vehicles including the hybrid types of vehicles that draw power partially from the batteries installed on a vehicle, the most challenging technical limitations are related the speed of recharging the batteries and the monitoring and maintenance of the health state and safe operations of the batteries. A driver of the electrically powered vehicle usually do not have time to wait for the prolong periods usually required to charge the batteries. Additionally, the health states of the batteries are critically important not only because the operation of the vehicle depends on the batteries but also the malfunctions of the batteries can cause hazards that may threaten the safety of the drivers and may further lead to public safety concerns.

Even that the gas-electrical hybrid powered vehicles have less concerns for charging the batteries within a short period because the batteries are charged when the engine is powered by burning the gasoline fuel, however, the limited lifetime of the batteries and the health condition of the batteries would still be the important cost and safety factors to take into consideration in owning and operating the gas-electrical hybrid cars. Periodically monitoring the conditions of the battery and proper maintenance of the batteries are still important and good operational routines a vehicle owner should practice for economically and safely operating the vehicle.

Additionally, limited energy storage in the battery is still limiting the total miles; an electrical car is able to travel before the total stored battery power is exhausted. Furthermore, even with improved charge techniques now explored and disclosed, the speed of charging up a battery for an electricity to continue the journey would still be too limiting compared to the time required a stop at a gas station to fill up the tank.

Therefore, a need still exists in the field of vehicle battery and energy supply to provide a new and improved systems and methods to resolved all the above discussed difficulties and limitations.

SUMMARY OF THE INVENTION

In one aspect, the present invention provides a battery exchange and/or lease system for a vehicle owner to make a stop at a battery refueling station when the battery on the car has already had a low capacity which can be quickly removed, and another battery that is fully charged is installed such that the battery "refueling" process may be executed quickly without being limited by the speed of recharging the batteries. Instead of owning the batteries, the owner or operator of the car may just lease the batteries or use the energy stored in the batteries under different energy purchase agreements required to drive the car for certain distance.

It is another aspect of this invention that each of the battery chargers or each of the batteries further includes a battery health state monitoring system. In a preferred embodiment, the system is implemented as an integrated circuit (IC) chip implemented with processes and functions for controlling certain sensing/measuring devices and also for receiving signals from these devices for continuously or periodically detecting designated operational or charging parameters of a battery as indicators for monitoring the conditions and providing diagnoses of any potential problems of the batteries.

It is another aspect of this invention that the IC chip is implemented as a controlling-and-monitoring system on chip that includes detecting and monitoring functions on a battery charging device for measuring and monitoring the conditions of the battery in every battery charge operation. In a preferred embodiment, the controlling and—monitoring system on chip further includes a transmitter for transmitting signals to specific signal receivers through local area network (LAN) WiFi/Wide area network (WAN) WiMAX, and/or wired Internet such that the measured parameters as indicators of the conditions of the battery can be monitored and applied for safe operation optimally charging and maintaining the batteries in a safe and healthy condition In one preferred embodiment, this invention discloses a method to supply electrical energy to a vehicle. The method includes a step of setting up battery refueling stations on a roadside. The method further includes a step of a driver driving a vehicle to the refuel station for the refuel station to carry out a process of removing charge-depleted batteries from the vehicle and installing full charged battery for supplying power to the vehicle onto the vehicle such that a vehicle driver does not have to wait for a prolong battery recharge period. It may also be charged overnight at home with designated intelligent charger.

In another embodiment, the present invention discloses a battery for providing energy to drive an engine of a vehicle. The battery further includes a controlling-and-monitoring system on chip implemented on an integrated circuit (IC) chip comprising sensing elements for detecting battery parameters indicating important conditions of the battery. In another embodiment, the controlling-and-monitoring system on chip that implemented on the IC chip further includes a transmitter for transmitting signals based on the battery parameters detected by the sensing elements (i.e., sensors). In another embodiment, this invention further includes a network for signal transmission for transmitting signals based on the battery parameters to a signal receiver for receiving, processing and monitoring the conditions of the battery.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a functional diagram for showing a system and method for removing depleted car batteries from a car and installing the freshly charged batteries to the vehicle of this invention.

FIG. 2 is diagram to show a battery implemented as a controlling-and-monitoring system on chip integrates as an IC chip with certain sensing capability and other sensing device such as thermal sensor for detecting battery parameters for monitoring and maintain health operation of the battery.

FIG. 2B is diagram to show a battery pack with battery management system (BMS) which may be integrated with auto maker. It may also be a separated BMS specifically for safety and life monitoring system incorporated by battery leasing company. FIG. 2C shows an intelligent charger incorporating a battery health check-up system.

FIG. 3 is a diagram for showing a signal transmission system implemented with cloud computing technologies for transmitting the detected parameters of the batteries from the battery BMS or intelligent charging system to a receiver in order to monitor and properly maintain the health operation of the batteries.

FIG. 4 is a diagram for showing a system configuration diagram transmission system implemented with cloud computing technologies via management information system (MIS) for transmitting the detected parameters of the batteries to a receiver in order to monitor and properly maintain the health operation of the batteries.

FIG. 5 is a functional block diagram for showing a system configuration diagram of the functional relationships, data paths and flow of diagnoses and analyses results.

FIG. 5.1-1 is a diagram for showing the differentiation of the two batteries by stratify the collected discharging current (Ad) data.

FIG. 5.2-1 is a diagram to show the relationships between order by subgroup (subgroup size: 5 samples) and the discharging current (Ad).

FIG. 5-3.1 is a diagram showing the two kinds of battery distribution of measurements in the Histogram.

FIG. 5-3.2 is a diagram to show the shape of the normal distribution.

FIG. 5-3.3 is a diagram showing the edge peak distribution similar to the normal distribution except that it has a large peak at one tail. Some battery data are mixing from the other production lot.

FIG. 5-3.4 is a diagram showing the bimodal distribution looks like the back of a two-humped camel which can be two-shift or two-equipment battery data in the same production lot.

FIG. 5-3.5 is a diagram to show the Cog-toothed (or Combed) shape; rounded-off battery data are errors and/or an incorrectly constructed in a combed distribution.

FIG. 5-3.6 is a diagram showing the truncated (or heart-cut) shape; the truncated distribution looks like a normal distribution with the tails cut off. Incompletely reported battery data or measured after inspection has rejected items outside specification limits as represented.

FIG. 5-3.7 is a diagram to show the battery specifications, and the battery process capability of quality characteristics will be assessed based on normal-distribution battery data.

FIG. 5-4.1 is a diagram to show the difference of two charts from run chart to control chart. The battery data from measurements of variations at key control points on the process-mapping is monitored using control charts.

FIG. 5-5.1 is a flow chart for showing different stages how to develop a robust statistical quality control in a cloud-computing mechanism, and promptly and effectively monitor the dominated quality characteristics of Lithium batteries.

FIG. 5-5.2 is a contrastive box plot with different categories of Lithium battery.

FIG. 5-5.3 is a contrastive individual value plot with different categories of Lithium battery.

FIG. 5-5.4 is a contrastive multi-variable chart with different categories of Lithium battery.

FIG. 5-5.5 is a contrastive time series plot with different categories of Lithium battery. FIGS. 5-5.2 to 5-5.5 are useful to isolate the critical issues of the problem among many different potential issues thus simplify the process of identifying a solution to a seemingly complex problem.

DETAILED DESCRIPTION OF THE PREFERRED EMBODIMENTS

Figure 6:
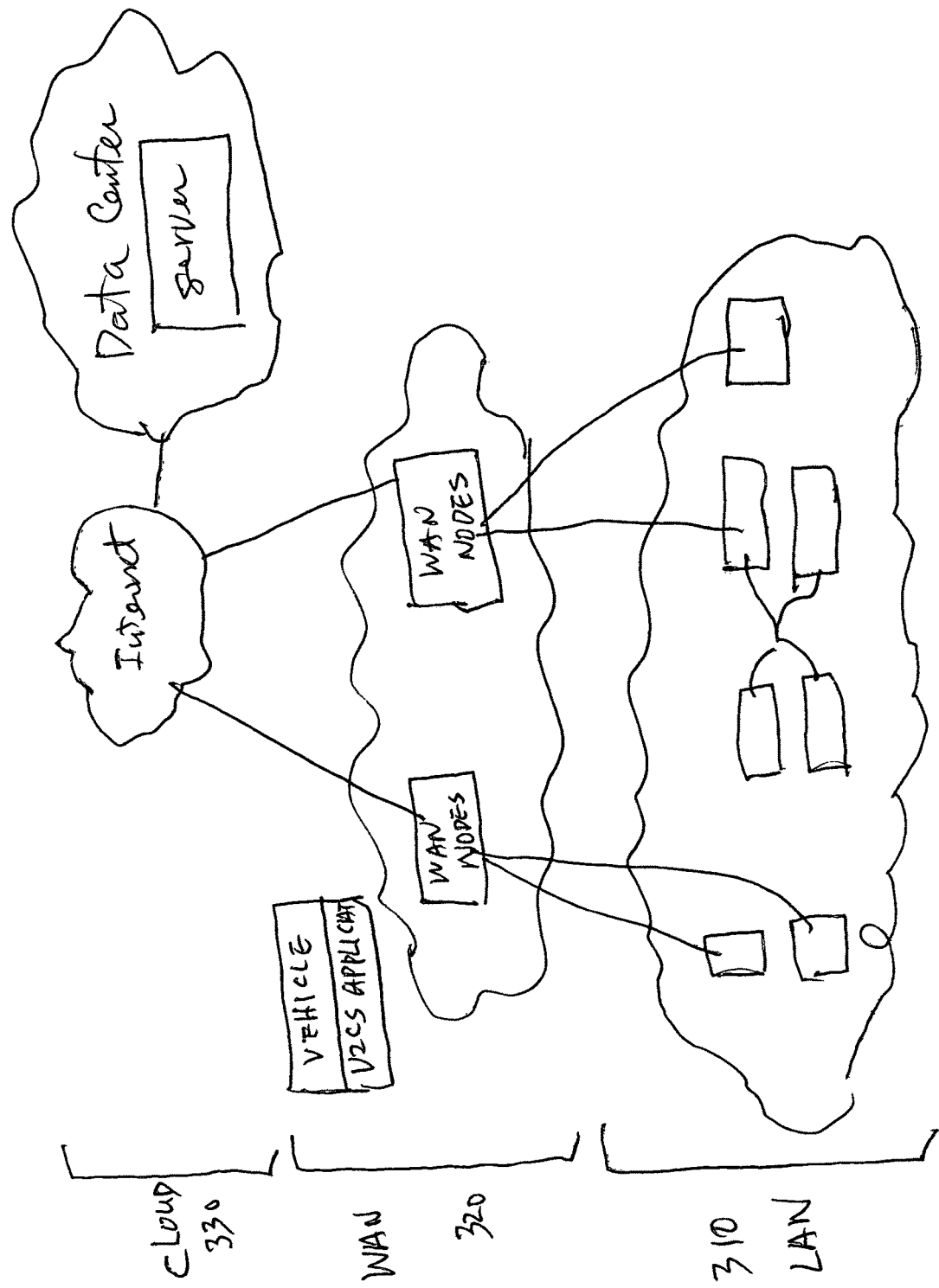
FIG. 6 shows an exemplary communication network.

FIG. 1 is a diagram for showing a system and method for supplying energy town electrically powered vehicle 110. The system includes a plurality of "battery refueling stations" 120-1, 120-2 and 120-3. Each of these battery refueling stations have freshly charged batteries ready to be installed onto the vehicle 110. The vehicle 110 as an electrically powered vehicle has depleted batteries after driving a certain distance finds out there is a battery refueling station 120-2 on the roadside. The driver drives the car 110 into the refueling station 120-2. The service persons in the battery refueling station 120-2 remove the depleted batteries from the vehicle 110 and install freshly charged batteries onto the car 110. In this system the vehicle owners may lease the batteries from a leasing company that either owned or alliance with the refueling station. The battery refueling stations charge the vehicle owners for the services and the vehicle owners do not have to wait for the battery to be charged in the refueling stations. The batteries of the vehicle are implemented with batteries that comply with certain standard sizes, configurations and connections which satisfy the auto maker specification. The removal and installation of the batteries can be conveniently carried out.

FIG. 2 is a diagram for showing a battery 180 of this invention. The battery 180 includes a 190-BMS system compose of IC chip 190 and an RFID for identifying the battery. This IC chip 190 may be implemented as a monitoring system on chip as part of automobile Battery Management System (BMS) to record the actual usage behavior and environmental conditions It may, as an option, include sensing elements for detecting and measuring important parameters of battery conditions As will be further shown in an alternate embodiment, the 2 It is to be noted that the sensing and refueling management functions performed by a monitoring and controlling system on chip 195 when implemented in a charging device is very different from a BMS IC chip 190 installed on an automobile. In order to effectively carry out the "battery refueling" process by exchanging a depleted battery with a fully charged battery at the refueling station 120-1, 120-2, 120-3, etc., it is required that the batteries 180 are made with standard size and configuration such that the batteries can be conveniently exchanged. Furthermore, in order to assure safely operation and reliable performance to power the vehicle, it is also preferred that the batteries are certified either by an automobile manufacturer, or creditable battery manufactured, or other independent institutes qualified to certify the batteries.

FIG. 2B is a diagram for showing a battery pack safety and life monitoring system as an alternate embodiment of this invention. The battery pack safety and life monitoring system includes a battery charger that incorporates a battery health checkup system. The battery pack safety and life monitoring system also includes a battery monitoring system (BMS). The car makers often install a BMS system on a vehicle to monitor and to reliably estimate the remaining capacity in the battery. Unless an agreement is achieved between the Car maker and the Battery maker, this safety BMS 190 may act independently without interference the BMS which auto maker installed. Both intelligent battery charger (FIG. 2C) and Battery pack with MBS 190 (FIG. 2B) have internet link to transmit signals including measured data for indicating the heath states of the battery through Internet as that further described below.

FIG. 2C shows a BMS-IC chip 195 of the battery pack safety and life monitoring system implemented in a charging station. The intelligent charger with the health checkup capability as discussed before is provide to monitor and control different sets of battery parameters than the BMS installed on a vehicle by an auto maker. The intelligent charger may be designed and implemented to read the identification (ID) of each battery pack wherein the battery cells may be linked preferably in parallel. The ID may be embedded in a RFID chip installed on each battery. The BMS system may further be implemented to read and store the charging station ID. The battery pack safety and life monitoring system may be implemented to measure the DC impedance and AC impedance of each battery pack. The measurements are carried out during a constant current charging operation before reaching a set battery voltage of the battery under charge. The measurement data includes a voltage versus time variation and the total accumulated charge. Further measurement includes the temperature variations during charge and other parameters for diagnosing the health state and any potential problems of the batteries under charge in each charging operation. The measurement data are transmitted through the Internet link to a data collection and analysis center for monitoring and analyzing the operational conditions of each of the batteries charged in each of the battery refueling stations. The Internet link may be established through wired personal computer, wireless transmission routers or Wi-Fi/WiMAX connections.

FIG. 3 is a functional block diagram for showing a system and method to continuously monitor the condition of the battery 180 of this invention. The IC chip 1951 implemented on intelligent battery charger 310-1 in the refuel station 120-1 and IC chip 190 implemented on the battery 180. The data on both Battery 180 IC chip 190 and IC chip 195-1 on intelligent charger 310-1 at refueling station 120-1, IC chip 195-2 on intelligent charger 310-2 at refueling station 120-2, etc. further transmit by means of internet link to the data center 200. The data transmitted from the IC chip 190 on battery 180, may be done at refueling station where the internet network is available. The signals are transmitted as wireless signals through local area network (LAN) or a Wi-Fi/WiMAX system by applying the cloud computing technology for transmitting through an Internet system 210 to a signal receiver 200. The signal receiver may be a receiver disposed on a battery monitoring and controlling center that may be implemented as a data collection center as shown in FIG. 4 blow. The receiver 200 may also be disposed in one of the refueling stations 120. The signals are received and processed and applied to monitor and maintain the batteries such that the batteries implemented to power the vehicle may be well kept and well operated.

FIG. 4 is a functional block diagram for illustrating the overall data flow and control signals of a battery charging, monitoring, data collection, analysis and control system. On the rightmost side, the data collection processes are carried out during the charge operations at refuel station. The data collected includes the Lithium battery (LiB) operation data and charging data. These data may be collected and provided in the charging stations and the BMS installed on the battery pack by the automaker, battery rental, or a battery operation company. The data collected are transmitted through the Internet links to a database in a data collection center that can be operated as a battery cloud data corporation. The cloud data corporation takes care of the data transmission and distribution processes according to mutually agreed data sharing privileges. The data collected is further analyzed by a data analysis and application entity that develops, maintains and operates data analysis software programs These data analysis programs are shown as Application Programs APP1, APP2, and APP3, etc. The analyzed data is further transmitted to a control center shown on the leftmost side of the diagram that control the total battery recharge processes according to the data analyzed by the data analysis and application software. The data collected and the analyzed when applied by the control center to control the entire operational processes may also be provided to the insurance companies, the battery pack makers or automakers according to the needs of these data in each of these operational entities.

The data analyses performed in the data analysis and application system shown in FIG. 4 are carried out for every battery pack with the past history of battery operation by applying a statistical process control (SPC) during each charge operation. When there is any abnormity detected, a warning message is sent to the charge station or a vehicle driver such that the battery can be removed from the fully-charged battery storage rack in the charge station. Upon detecting the abnormality of a battery pack, a message can also be sent to a battery pack supplier with the necessary data such that the problems and technical issues that cause the abnormal battery conditions can be resolved soon after such problems are detected. Therefore, a system may be setup to exchange the collected and analyzed data with some stored in the database through a system of value chains. The value chains of data and information exchanges may include every parties involved in the manufacturing, repairing, operation, charging, and insure the safe and reliable operation of the vehicles powered by the batteries. These parties of value exchanges including monetary or other types of commercial exchanges can and limited to battery pack manufacturer, automakers, charge stations, auto insurance companies, highway safety agencies, and other related parties. The data as collected and analyzed may also be applied to certify batteries and classify batteries into different grades depending on applications and situations of these batteries in providing the power to different types of vehicles.

For the purpose of establishing a standard for monitoring, managing and controlling the working environment and a safe operation of the batteries and also to make, sure that data collections and analyses are properly carried out, this invention implements a special battery monitoring statistical analysis process. The battery monitoring statistical analysis process is implemented to detect deviations or abnormal battery conditions during the lifetime of the batteries to assure all the batteries are managed and maintained to operate in safe and reliable conditions. The battery monitoring statistical analyses processes collect and apply all data that may potentially influence the operations and accuracies of the entire monitoring processes. The data may include but not limited to data pertaining to the working environment such as temperature and humidity of the charging stations, members of each of the working teams such as name and working experience of the persons who operate the charging device, the details of the battery charging processes, the type and model numbers of the charging devices, the details of the measuring devices applied for measuring the data, etc.

The charge stations have charging process monitoring systems that automatically collect all the data as described above. Statistical analyses are then performed on these data as will be further described below to continuously monitor the health conditions of the batteries. Examples of data collection by the battery monitoring systems include the identification number of battery (battery ID No.), vehicle ID number that operates with a battery at certain time periods, the charging voltage Vc, e.g., 110V or 220V, 50.about.60 Hz, battery discharging voltage Vd, e.g., 24V.about.48V, battery charging current Ac, e.g., 10 A.about.20 A, battery discharging current Ad, e.g., 10 A, battery capacity Wb, e.g., 22 KWH, battery charge time Tc, e.g., 10 Hours, battery discharge time Td, e.g., 45.8 Hours, percentage of battery charged, e.g., 50% when the battery is charged only 5 hours instead of 10 hours to fully charge the battery.

FIG. 5 is a functional block diagram to illustrate the processing and transmission paths of the life and health battery data. The functional block diagram also clearly illustrates some of the benefits generated by implementing the battery charging and monitoring system of this invention. Specifically, a vehicle battery health and life management company (V-BHLMC) is established that operates with cloud company capabilities to collect all the life and health data of all the batteries recharged by the charging and monitoring systems of this invention as that shown in FIGS. 1 to 4 above. The life and health data are collected according to a data purchase (DP) agreement DP1 and also a business alliance (BA), i.e., BA1, between the VBHLMC and the refueling stations and also the battery leasing company. The vehicle battery health and life management company (V-BHLMC) also applies the statistical quality control (SQC) analyses described above to track and detect if any potential health problems of all the batteries. Some of the data collected and results of battery health analysis results, especially an alarm of abnormal battery health for certain batteries are provided to the battery refueling stations and battery leasing companies as part of a diagnosis service (DS), i.e., DS1 between the V-BHLMC and the refueling station and the battery leasing company. Under a separate data purchase (DP) agreement DP2, the auto insurance company may also purchase part of the battery life and health data or the SQC analysis results from the V-BHLMC. With additional data and information made avail to the auto insurance company, a benefit of reducing the auto insurance premium may be realized because the risks of events caused by battery abnormal operations are reduced. FIG. 5 further illustrates that there are data purchase DP agreements, business alliance BA agreements, and diagnosis service DS agreements between many different business entities including the V-BHLMC, the battery refueling station and the battery leasing company, the auto maker, and the battery maker.

A technique of structural differentiation method is applied to collect the data according to different data categories. When the data are collected and organized into different categories, the characteristic differences of an abnormal data can be quickly differentiated. A complex technical problem when organized according to different categories, the data presented with these different categories can be very useful to isolate the critical issues of the problem among many different potential issues thus simplify the process of identifying a solution to a seemingly complex problem For example, once the battery discharging current (Ad) is collected from charge station of electrically powered vehicles, it will compare with Ad of the same production lot immediately. The production batteries in the same lot can be identified by the battery barcode records of electrically powered vehicles. In addition, the differentiation of the two batteries can be figured out (see the FIG. 5.1-1) by stratify the collected discharging current (Ad) data through the suitable statistical tool, and can further proceed the data analysis and conduct a valuable decision-making.

Run chart: Run charts are analyzed to discover anomalies in data which suggest shifts in a process over time scale (eg, days, weeks, months, quarters) or special factors on the horizontal axis that may be influencing the variability of a process. The vertical axis represents the quality indicator such as discharging current (Ad), discharging voltage (Vd), charge time (Tc), discharge time (Td), etc. Normally, the median is calculated and employed as the chart's centerline because it provides the point where half the observations are expected to be above and below the centerline and will not be influenced by extreme values in the data. Besides, target lines and annotations of significant changes and other events can also be put into the run chart. FIG. 5.2-1 describes the relationships between order by subgroup (subgroup size: 5 samples) and the discharging current (Ad) for battery B0001. As a result, the, run chart can, evaluate the status and trend for each of batteries, and further make a troubleshooting diagnosis and processing.

Histogram: The Histogram represents the frequency distribution across a set of measurements as a set of physical bars, and the width of each bar is constant and delicates a fixed range of measurements (say sets). The height of each bar is proportional to the number of above range of measurements. Overall shape shows the distribution of measurements can be seen far more clearly in the Histogram as shown in FIG. 5-3.1. All the collected measurement data, whose minimum data numbers need to greater than or equal to 50 and the best is greater than 100, can be altered in terms of time periods, production lots, operational workers, and so forth. The normal way to determine the Histogram sets conform to the range of data numbers as represented in Table 1. The main causes on data-measured differentiation are errors for accuracy (e.g., bias, linearity and stability) and precision of measurement system. The judgments of precision can be denoted below:

Repeatability: The variance of equipment occurs on the same measurement instrument, same measurement operator, and same measurement sample.

Reproducibility: The variance of appraiser results from the same measurement instrument, same measurement sample, and different measurement appraisers.

Parts variance: occurs on the same measurement instrument, same measurement operator, and different measurement samples.

TABLE 1

| Collected data number | sets |
|---|---|
| 50~100 | 6~10 |
| 100~250 | 7~12 |
| 250 or Greater | 10~20 |

A exemplar for evaluating the Histogram sets can be developed, and the collected 100 data of discharging current (Ad) in the same production lot can be seen in Table 2.

TABLE 2

| | | | | | | | | | |
|---|---|---|---|---|---|---|---|---|---|
| 9.94 | 9.93 | 10.00 | 9.98 | 9.94 | 10.00 | 9.97 | 10.01 | 10.07 | 9.89 |
| 9.99 | 10.02 | 9.98 | 9.91 | 9.98 | 9.94 | 9.96 | 9.92 | 9.96 | 9.97 |
| 9.92 | 10.03 | 10.09 | 9.95 | 10.00 | 9.94 | 9.97 | 9.98 | 9.93 | 9.94 |
| 10.07 | 9.98 | 9.97 | 9.95 | 10.05 | 9.92 | 9.95 | 9.97 | 9.93 | 10.00 |
| 9.98 | 9.96 | 9.95 | 9.98 | 9.99 | 10.03 | 10.02 | 10.00 | 9.98 | 9.90 |
| 9.88 | 10.05 | 9.97 | 9.97 | 9.96 | 10.01 | 9.91 | 10.01 | 9.97 | 9.93 |
| 9.99 | 9.96 | 9.95 | 9.99 | 9.97 | 9.96 | 10.00 | 9.96 | 10.03 | 10.05 |
| 9.98 | 9.96 | 10.03 | 10.02 | 9.97 | 10.03 | 9.99 | 9.96 | 10.01 | 9.95 |
| 9.96 | 9.95 | 9.99 | 9.98 | 9.93 | 9.97 | 10.00 | 9.96 | 10.02 | 9.97 |
| 9.97 | 10.00 | 10.01 | 10.00 | 9.99 | 10.05 | 10.00 | 9.90 | 10.05 | 9.97 |

According to the Table 2, the collected data numbers are N=100, and the number of sets (Ns) is selected by 10. Moreover, the maximum value a=10.09 and the minimum value is 9.8, and the range R=10.09-9.88=0.21, C=R/Ns=0.21/10=0.021; furthermore, C=0.02 is set by the measurement unit equals to 0.01, and boundary value is set to 0.005 (i.e., 0.01 divided by 2). The distributed frequency can be represented in Table 3.

TABLE 3

| Set No. | Lower Limit | Center | Upper Limit | Frequency Distribution | No. of Times |
|---|---|---|---|---|---|
| 1 | 9.88 − 0.005 = 9.875 | 9.885 | 9.875 + 0.02 = 9.895 | II | 2 |
| 2 | 9.895 | 9.905 | 9.895 + 0.02 = 9.915 | IIII | 4 |
| 3 | 9.915 | 9.925 | 9.915 + 0.02 = 9.935 | ℍℍ III | 8 |
| 4 | 9.935 | 9.945 | 9.935 + 0.02 = 9.955 | ℍℍ ℍℍ II | 12 |
| 5 | 9.955 | 9.965 | 9.955 + 0.02 = 9.975 | ℍℍ ℍℍ ℍℍ ℍℍ ℍℍ | 25 |
| 6 | 9.975 | 9.985 | 9.975 + 0.02 = 9.995 | ℍℍ ℍℍ ℍℍ II | 17 |
| 7 | 9.995 | 10.005 | 9.995 + 0.02 = 10.015 | ℍℍ ℍℍ ℍℍ | 15 |
| 8 | 10.015 | 10.025 | 10.015 + 0.02 = 10.035 | ℍℍ II | 9 |
| 9 | 10.035 | 10.045 | 10.035 + 0.02 = 10.055 | ℍℍ | 5 |
| 10 | 10.055 | 10.065 | 10.055 + 0.02 = 10.075 | II | 2 |
| 11 | 10.075 | 10.085 | 10.075 + 0.02 = 10.095 | I | 1 |

Common Histogram shapes are normal distribution: divided by its symmetry axis shown in FIG. 5-3.2. Problems may be indicated by the distribution being naturally non-bell-shaped or by problems with the measurement. When a distribution differs from the expected normal (bell-shaped) shape such as Isolated-peaked (Edge-peak), dual-peaked (bimodal), Cog-toothed (or Combed), Truncated (or heart-cut), etc., the underlying process should be reviewed to come across real causes of this.

Isolated-peaked (Edge-peak) shape: The edge peak distribution is similar to the normal distribution except that it has a large peak at one tail (FIG. 5-3.3). Normally, this is caused by faulty construction of the histogram; for example, some battery data mixing from the other production lot.

Double-peaked or bimodal shape: The bimodal distribution looks like the back of a two-humped camel. The outcomes of two processes with different distributions are combined in one set of data. For instance, a distribution of two-shift or two-equipment battery data in the same production lot might be bimodal as shown in FIG. 5-3.4.

Cog-toothed (or Combed) shape: In a combed distribution, the bars are alternately tall and short, which can be seen in FIG. 5-3.5. This distribution often results from data-processing problems: rounded-off battery data errors and/or an incorrectly constructed histogram.

Truncated (or heart-cut) shape: The truncated distribution looks like a normal distribution with the tails cut off. The battery supplier might be producing a normal distribution of material and then relying on inspection to separate what is within specification limits from what is out of spec. Incompletely reported battery data or measured after inspection has rejected items outside specification limits as represented in FIG. 5-3.6.

Comparing with the battery specifications, the battery process capability of quality characteristics will be assessed based on normal-distribution battery data as shown in FIG. 5-3.7.

Control chart: An advantage of SPC over quality control, such as "inspection", which emphasizes early detection and prevention of problems to eliminate the on-site abnormal causes of characteristics, rather than the correction of problems after they have occurred. The battery data from measurements of variations at key control points on the process-mapping is monitored using control charts. FIG. 5-4.1 illustrates the difference of two charts from run chart to control chart.

Control charts can be categorized into two groups: one group is for counting value (i.e., discrete attributes such as defect numbers, flaws, accidences, etc.), and the other is for variable value (i.e., continuous variables such as length, weight, time period, etc.). Moreover, control charts usually have two types as described below, and their definition, computing formula and identification methodologies of abnormal points can be in reference to contexts of the statistical quality control (SQC) materials.

variable value: x-R chart, x-S chart, x-Rm chart, etc.
counting value: np chart, p chart, u chart, c chart.

To assure that the product can satisfy the customer requirements and effectively monitor and promptly improve the quality of products, the working environmental control and on-site data monitoring system of electrically powered vehicles will be completely established. As a result, the SPC system will play a critical role to manage and monitor car-battery for safely and effectively supply energy to electrically powered vehicles. Moreover, the cost benefit will be highly raised, and the proposed methodologies will make a great progress via PDCA cycles.

A special business alliance BA5 agreement is established between the V-BHLMC and a battery diagnosis laboratory such that a large amount of data collected by the V-BHLMC are further analyzed and selected abnormal batteries are further tested in the diagnosis laboratory. As the V-BLHMC conducts the SQC analyses to large number of batteries, the purpose is to differentiate and identify particular batteries that are abnormal for sending alarm signals to replace or repair these batteries. However, the V-BLHMC is not provided with technical expertise to identify the fundamental or real technical problems of the abnormal batteries. The battery diagnosis laboratory performs tests and analyses to determine and confirm the problems and also find out solutions to resolve the technical issues behind these abnormal operation conditions. Therefore, Li+ Battery data collection & analysis executed by battery diagnosis lab., and data flow control & distribution implemented by gas station also battery leasing Co. under a flow chart for a robust SQC control; all the databases integrated by V-BHLMC cloud computing Co.

FIG. 5-5.1 showing a SQC flow chart which falls into three stages can be shown below: Stage 1. Arrange some of the sensors-collected sampling data and detailed descriptions thereof. Stage 2 Analyze the above sampling data through quality control seven tools—histogram, box plot, individual value plot, multi-vari chart and time series plot, and coefficient of variation (CV), coordinate with project team to diagnosis the root causes of the defect deviations or abnormal symptoms, and further determine the required control parameters and monitoring quality characteristics. Stage 3. Setup SPC and cloud-computing mechanism to promptly and effectively monitor the dominated quality characteristics.

A technique of structural differentiation method using multi-dimensional scaling (usually in two dimensions) is applied to collect and analyze the data according to different data categories. The data presented graphs with these different categories such as box plot, individual value plot, multi-vari chart and time series plot (see FIGS. 5-5.2 to 5-5.5) can be very useful to isolate the critical issues of the problem among many different potential issues thus simplify the process of identifying a solution to a seemingly complex problem.

Coefficient of variation (CV): A coefficient of variation delicates the measure of relative variability, which equals to the standard deviation divided b the mean, and normally expressed as a percentage. Because it is a dimensionless number, It is useful in comparing the dispersion of populations with significantly different means.

For the purpose of tracking the operation conditions of each rechargeable batteries, the integrated circuit (IC) chip installed on the battery further includes sensors for continuously monitoring the environmental conditions under which the battery operates. Sensors for monitoring the temperature, air moisture level, and all operation condition of the battery, such as the voltages across different cells, output current variations, temperature variation of the battery, etc. These parameters are also transmitted to a battery health and life analysis and management center. These data are collected and stored for further detail analyses.

According to FIGS. 3, 4, and 5 this invention discloses a wireless network communication system to carry out cloud computing for monitoring and managing the health and conditions of batteries of the electrical vehicles. As an embodiment for carrying out process functions of this invention further illustrated in the following embodiments, wherein a computer network is a geographically distributed collection of nodes interconnected by communication links and segments for transporting data between these end nodes. For example, such nodes may include personal computers and workstations, or other devices, such as various kinds of detectors and sensors, etc. There are wide verities of networks that may include local area networks (LANs) and wide area networks (WANs). Computer communication networks many include other types of networks, such as personal area networks (PANs), field area networks (FANs), neighborhood area networks (NANs).

An exemplary computer network is shown FIG. 6 that illustrates typical nodes or devices implemented at different levels of network interconnected by various methods of communications as described above and depicted in FIGS. 4, 5 and 8. The interconnection links may be wireless or wired connections configured with interconnections of routers, or different types of links depending on distance, operational status, locations, connectivity, and signal strengths, etc.

Specifically, the network as that illustrated in FIG. 6 includes three layers of networks. The first layer of network is the local network 310 (LAN) connected through a local link to a second layer 320 Internet for establishing communication links as wide area network (WAN) with a cloud layer of network 330. As further described below, an electrical vehicle driving to a charging station may link through the cloud network 330 and the Internet 320 to communicate with the local area network 310 310 to establish a vehicle to charging station (V2CS) communication link.

Figure 7:
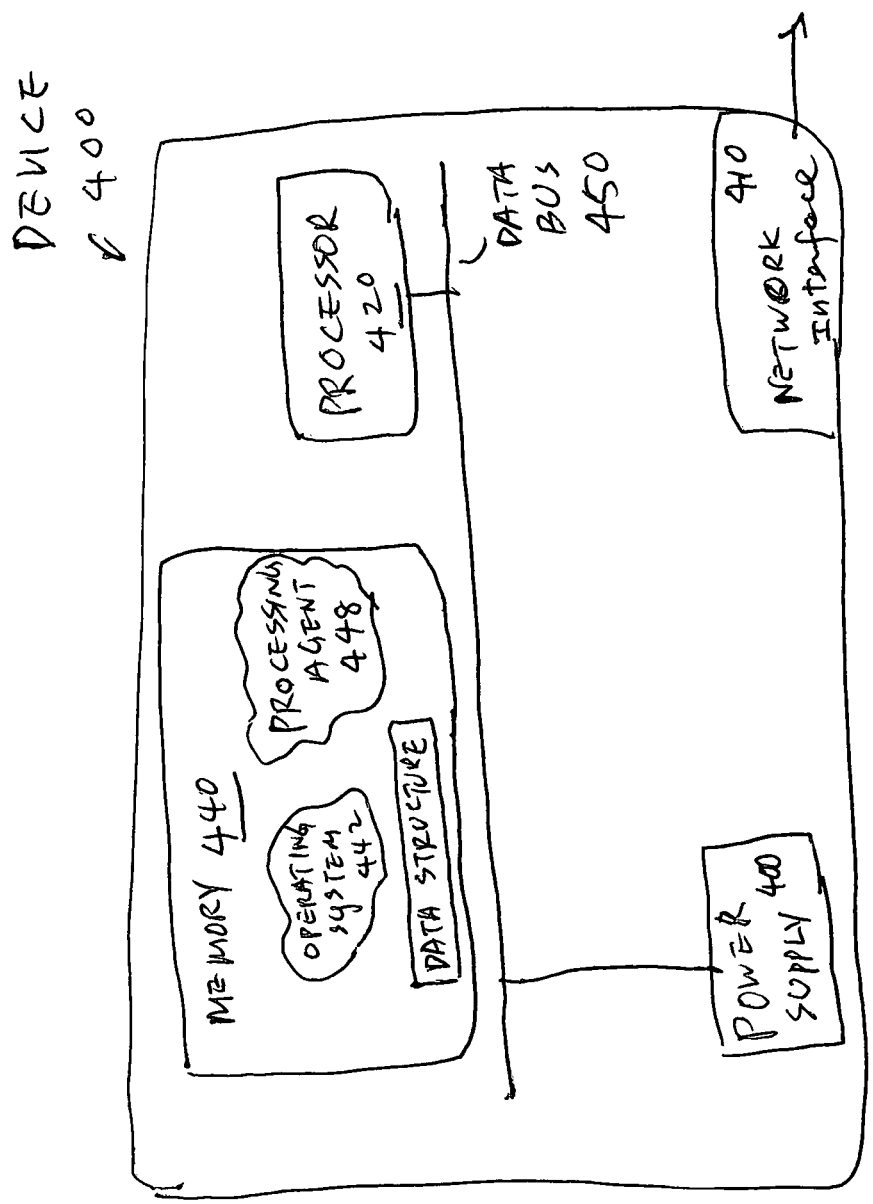
FIG. 7 shows an exemplary communication network device implemented in the network.

FIG. 7 shows a schematic block diagram of a general and typical computing device 400 that can be implemented in one or more embodiments described in the invention such as any device or node that is illustrated in FIG. 6. The device 400 may comprise one or more network interfaces 410 that may include wired, wireless, cellular, PLC, etc. Typically, the device further comprise at least one processor 420, and a memory 440 interconnected by a system bus 450, as well as a power supply 460 such as battery or power outlet plug-in, etc. The network interface may be implemented as circuits for receiving and transmitting signals or devices for communicating data over links, either wired or wireless links, coupled to the networks as that shown in FIG. 6. For carrying out functional processes of this invention, executable programs and data are stored in the memory 440 that may include one or several storage devices and addressable by the processor 420 and may also be addressable by the network interface 410. The memory 440 stores software programs and data structures associated with the functional processes described in this invention below. The processor 420 implemented in this invention may also include hardware elements or logic that is adapted for executing the software programs and manipulating the data structures 445. The processor further execute the operating system 442 resides in the memory 440 to operate and manage the computing device 400 including steps of functionally organizing the device by, among other things, invoking operations in support of software processes and/or services executing on the device. These software processes and/or services may comprise a modular process 448 to carry out prediction and preparation functions as that illustrated in FIG. 6 and further described below. As further described below the typical computing device as shown may presented in different nodes in different layers of the computer networks shown in FIG. 6 wherein the data structures and functional processes necessary to complete the arrival-ready as that requested by a client-passenger cab be flexibly achieved. Note that as described below, one or more interconnects 490 may also be present on the device 400, such as various mechanical and/or electrical interconnects to allow interconnection between different nodes distributed over different layers of networks as that that in FIG. 6. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 8:
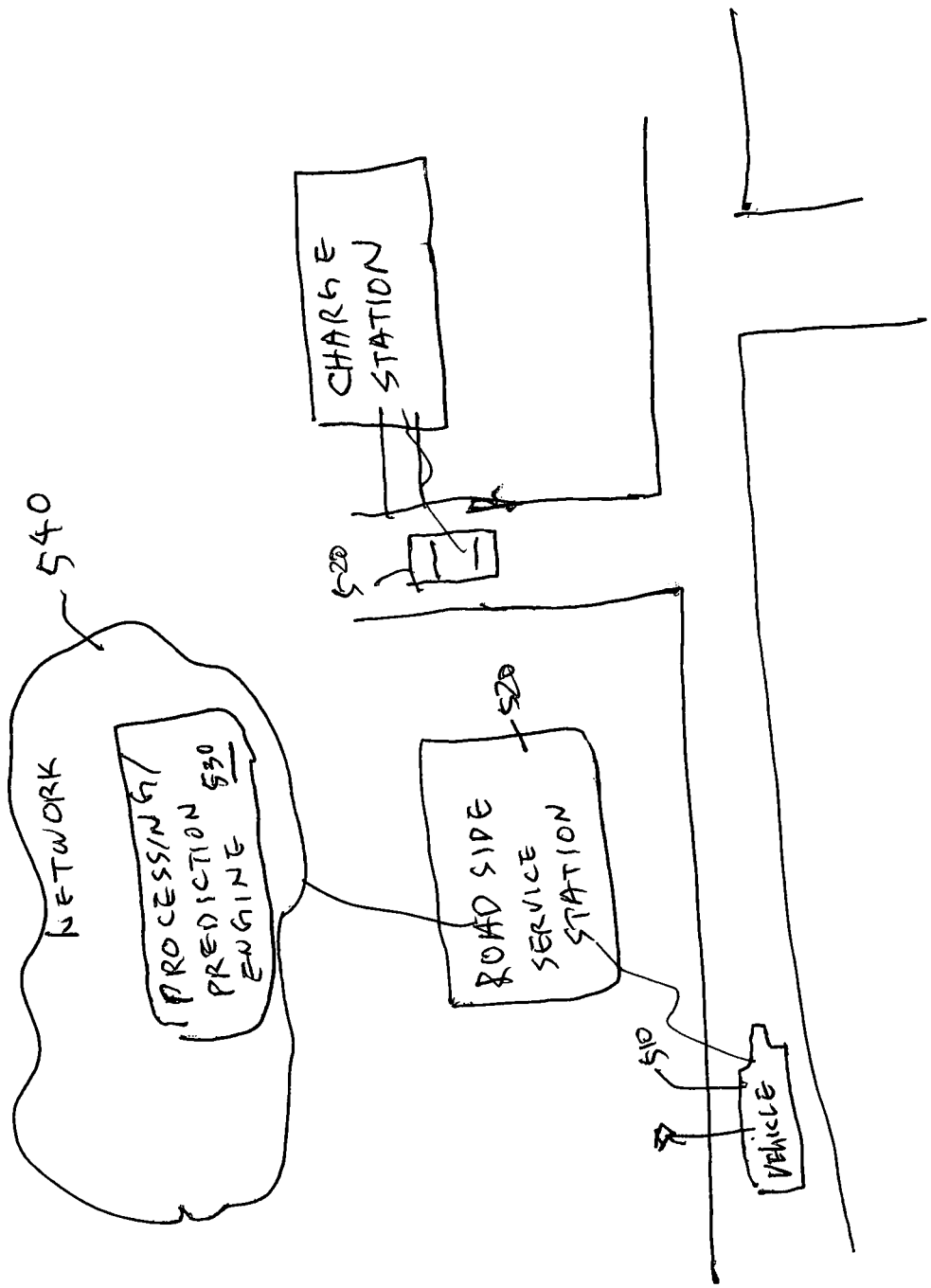
FIG. 8 shows an exemplary communication network system for predicting the arrival time of a vehicle to a designated charging station or a tire service center.

The present invention implement various kinds of predictive and preparatory techniques operated on the V2CS communication networks as shown in FIGS. 6 and 7. In an exemplary embodiment, as shown in FIG. 8, a first step when the electrical vehicle 510 passes through an area covered by a communication node 520 that may be a roadside monitoring station (RSMS) for the V2CS network, the node 520 can collect the vehicle traveling information such as location, speed, direction of traveling and time passing through the location. Additional information of the vehicle including the battery serial number and conditions of the battery providing power to the electrical vehicle are also transmitted from the electrical vehicle to the communication node 520. Many of these applications will be administering real-world resources at these nodes. As one example, as shown in FIG. 7, a dynamic wireless power transfer (WPT) technology system 300 uses inductive coils (charging zones 330) embedded in lanes and driven by grid controllers (road-side units (RSUs) 340 and/or road-side controllers (RSCs) 320 of certain communication domains 310) that dynamically control these coils to deliver energy to vehicles 140 as they pass over them. Availability of sufficient amount of electrical energy in the form of electric charge present at correct series of coils is an example of such a resource that is provisioned and administered by the V2CS infrastructure. In particular, as the vehicle moves from one RSC to next, the electrical coil associated with the new RSC is the one adjacent and under the control of that RSC. So as the associativity changes, so does the location of the application resource (electrical coils and charge delivery mechanism).

In next step, a prediction agent 530 running on the network 540, e.g., a wide area network (WAN), first collects the real time data as monitored by the RSMS. In the networked nodes through the WAN, the prediction agent process may generally operate within one or more devices on the network infrastructure other than the electrical vehicle itself, or even on a portion of the vehicle 510 in certain embodiment of this invention. Following the second step as described above, the prediction agent process may apply different extrapolation techniques to predict next possible node and the time of arrival to that node according to a predicted path. The data that now available in the current node as a profile of the vehicle may also transmitted to the next node once the vehicle is moving toward the predicted traveling route to gradually approaching the next node as predicted. The time of arrival prediction therefore is computed based on real time data continuously received by different nodes through tracking along the way following the movement of the vehicle. In the meantime, the roadside monitoring station (RSMS) may also transmit the real time traffic condition to the prediction agent process for more precisely predicting the time of arrival of the electrical vehicle to the charging station. As the vehicle travels from one area covered by one node of Road Side Monitoring Station to next node, there may be a "hand over" process to transmit the vehicle profile from one node to the next node while the vehicle continues to travel along a route to arrive at the designated charging station.

Figure 9:
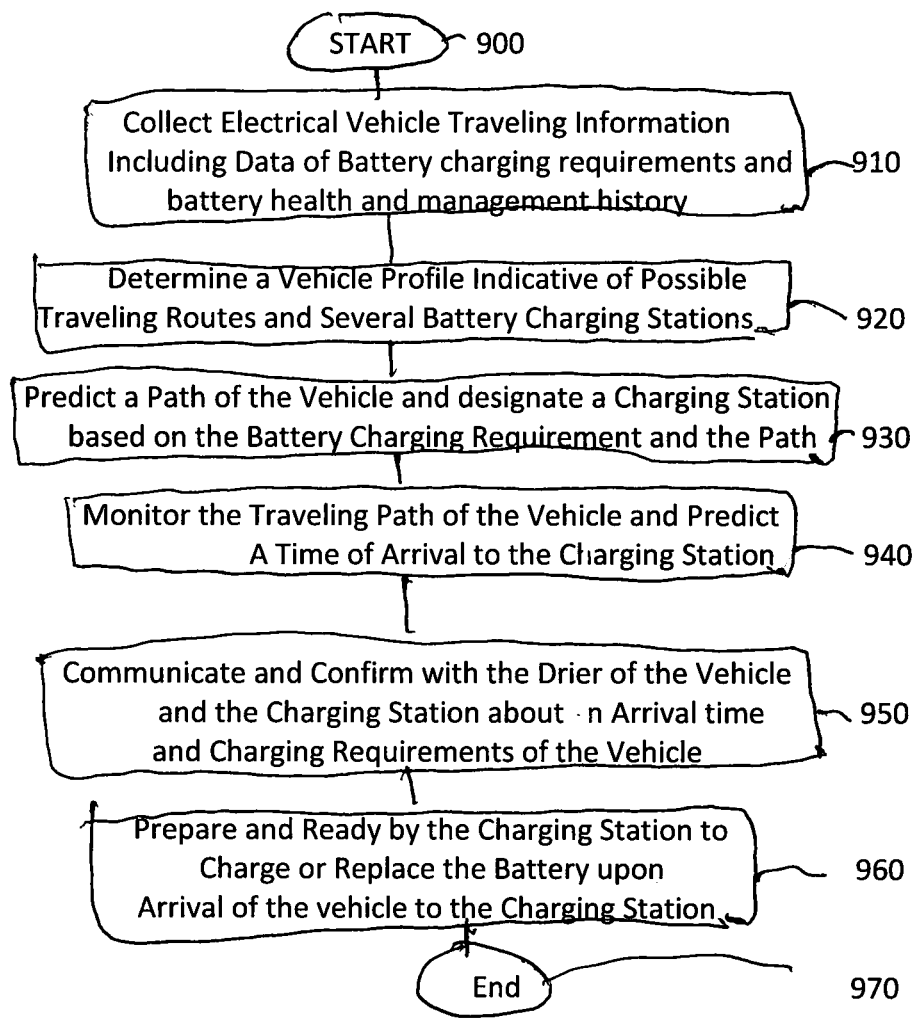
FIG. 9 is flow chart to illustration processing steps for monitoring and predicting the arrival time to a charging station or a tire service center to prepare arrival-ready services.

FIG. 9 shows an exemplary and simplified procedure for transmitting to the charging-station the predicted time of arrival of the electrical vehicle to a charging station such that the charging station is prepared and be arrival-ready. The procedure starts at step 900 with the process starts by collecting the electrical vehicle traveling information by one of the devices 400 as shown in FIG. 7 wherein the vehicle traveling information includes data of the battery and the health and battery management history data (step 910). The process continues with one processor in one of nodes determines a vehicle profile indicative of possible traveling route and several charging stations on these traveling routes (Step 920). The process continues with a predictive process agent residing on one of the devices. e.g., device 400 in FIG. 7, predicts a traveling path and designates a charging station based on the battery charging requirements and the predicted path (step 930). Then the roadside monitoring service station monitors the path and the traveling condition of the vehicle and provides the information to the predictive process agent (step 940). The predictive process agent then confirms with the driver of the vehicle and the charging station about the arrival time of the vehicle to the charging station (step 950). The charging station then prepares and get ready according to the charging requirements and the health and maintenance conditions of the battery for providing necessary services to the vehicle thus an arrival-ready service is ready when the vehicle arrives at the charging station (step 960) before the prediction and preparation processes ended (step 970).

As shown in the above drawings and descriptions, the vehicle battery is implemented with real-time sensors and processor to measure the real time operational parameters and to transmit these measured parameters to the battery health and safety management center. The battery health and safety management center is also implemented with database and safety monitoring processes to closely monitor and watch the health and condition of the battery on the vehicle. An alarm signal is transmitted to the vehicle upon detecting a potential safety or a potentially hazardous operational condition so the vehicle may quickly and timely respond to the alarmed problematic conditions as that predicted and warned by the battery health and safety management center.

With sensors implemented on the battery to detect the operational conditions including voltages and currents from each cell of the battery, additional data of the operational conditions of cells of a battery are transmitted to the battery health and safety analysis and management center. The trends and variations of the operational conditions of the cells of one battery are analyzed to determine the health status and the operational conditions of each battery. Additionally, the variations among cells of a battery are analyzed to trace back to the factory where manufacturing processes are performed to manufacture different cells of each battery. The results of these analyses are then applied to monitor and improve the manufacturing processes of the factory that related to the performance variation among different cells. Additionally, the charging stations that charge the battery also transmits data for charging each cell to the battery health and safety analysis and management center and these measured parameters are also analyzed to monitor the health and conditions of the battery. As more and more vehicles are implemented with blue tooth and various Internet of Things (IOT) data transmissions, storage and processing function, the battery operation and charging data are also transmitted and stored in the data storage and processing servers as an option as well when such features are implemented in the vehicle.

The detail records in the manufacturing processes including the records of man, machine, manufacture method and environment (4M1E) are analyzed by applying special statistical analyses to determine for the differences between the production lots. The differences of the 4M1E between the production lots are analyzed and applied to differentiate the performance and to predict the health and operational requirements of the batteries. Additionally, the historical records of the vehicle operations including the speed and acceleration variations, the records of impacts or accident to the vehicle or all available records related to the histories and operations of the vehicle are stored and made available to the battery health and safety analysis and management center for carrying out analyses for monitoring and managing the health and operations of the battery installed on the vehicle. The results of these analyses are also applied to the control and management of auto pilot process for controlling and operating vehicles operated under the auto pilot operating conditions to improve and optimize the operation and management of vehicle batteries.

According to above descriptions and drawings, this invention discloses a system for managing rechargeable batteries to provide power to vehicles. The system includes a battery health state monitoring sensor implemented as an integrated circuit (IC) chip on the rechargeable batteries for detecting and storing data of battery health state parameters on each of the vehicles having a transmitter to transmit the battery health state parameters as wireless signals. The battery management center includes a networked server to receive the battery health state parameters transmitted as the wireless signals to continuously collect the battery health management parameters from the plurality of rechargeable batteries. The battery management center further categorizes the health management parameters into different categories according to a time sequence to perform statistical data analyses on the battery health management parameters collected for detecting an abnormal condition of a rechargeable battery. In one of preferred embodiment, the battery health state monitoring sensor implemented as the IC chip on the rechargeable batteries further detecting, storing and transmitting data of battery health state parameters including discharge currents (Ad), discharging voltages (Vd), a charge time (Tc), and a discharge time (Td) during the intelligent charger charges the rechargeable batteries. In one of preferred embodiment, the battery health state monitoring sensor implemented as the IC chip on the rechargeable batteries further detecting, storing and transmitting data of operational environments surrounding the rechargeable battery including temperature and humidity variations, vehicle speed, vehicle acceleration and deceleration, and vehicle impacts. In one of preferred embodiment, the battery management center further receives, stores and analyzes man, machine, manufacture, method and environment (4E1M) parameters from vehicle manufacturers, battery pack assemblers, and battery cell manufacturers, and the battery management center further performs statistical process control methods (SPC) to analyze and correlate the aging and power supply performance to the 4E1M parameters of the rechargeable batteries. In one of preferred embodiment, the battery management center continuously collects and analyzes the battery health management parameters for detecting the abnormal condition of a rechargeable battery and the battery management center sends a warning message to a charge state or a vehicle driver when the abnormal condition of a rechargeable battery is detected. In one of preferred embodiment, the battery management center continuously collects and analyzes the battery health management parameters from the plurality of batteries for detecting the abnormal condition of a rechargeable battery and the battery management center sends a message to a battery pack supplier with necessary data of the abnormal condition for resolving technical issues that cause the abnormal condition. In one of preferred embodiment, the battery management center continuously collects and analyzes the battery health management parameters from the plurality batteries for maintaining and continuously monitoring conditions of each of the rechargeable batteries and the battery management center sends the battery health management parameters to a battery pack supplier, a battery manufacturer, an insurance company, a highway safety agency and an automaker as commercially or technically required. In one of preferred embodiment, the battery management center continuously collects and analyzes the battery health management parameters from the plurality batteries for maintaining and continuously monitoring conditions of each of the rechargeable batteries and the battery management center applies the battery health management parameters and the conditions of a plurality of the rechargeable batteries to certify and classify the rechargeable batteries into different categories. In one of preferred embodiment, the battery management center further receives, stores and analyzes performance differences between different battery cells for each of the batteries for correlating the performance differences to the 4M1E parameters among different manufacturing lots. In one of preferred embodiment, the system further includes a plurality of charging stations each includes at least an intelligent battery charger for charging the rechargeable batteries. The intelligent battery chargers further comprises a battery diagnostic detector for detecting and storing data of designated battery health management parameters. The intelligent tire service station further comprises a transmitter for transmitting the data of designated tire health management parameters as wireless signals to a networked server in a tire management center wherein the tire management center continuously collects tire health management parameters from the plurality of tire service stations and categorizes the health management parameters into different categories according to a time sequence to perform statistical data analyses on the tire health management parameters collected for detecting an abnormal condition of a tire. In one of preferred embodiment, at least one of the plurality of charging stations includes at least an ready for immediate replacement battery for replacing one the rechargeable batteries operated on one of the vehicles. In one preferred embodiment, the battery management center further receives, stores and analyzes performance differences between different battery cells for each of the batteries for correlating the performance differences to the 4M1E parameters among different manufacturing lots and the battery management center further provides relevant data and information with early detection of defective batch predictions to vehicle makers, battery cell makers, battery pack makers for taking corrective and preventive measures.

The battery health and safety analysis and management center is further implemented to monitor, maintain, analyze and manage the health and safety of tires of vehicles. Just like the batteries installed on the vehicles, each tire mounted on the vehicles are provided with manufactured records collected, stored and analyzed in the vehicle tire and battery health and safety analysis and management center. Each tire is further implemented with sensors, strain gauges and transmitters to transmit the measured data of tire pressure, bearing weight, stain and stress at key measuring points, shape-bending, temperature variation, tire thickness, speed of rotation, and different operational conditions. Operational conditions including tire slipping at slippery road are also measured and recorded. All these data, parameters, measurements, and records are stored and analyzed in the vehicle tire and battery health and safety analysis and management center. Statistical and various variance analyses are performed to track and monitor the health and safety of the tire and battery of a vehicle by applying data starting from the manufacture process throughout the operation life of the vehicles. Artificial intelligent software programs applying to analyze the big data are applied to carry out different analyses in the vehicle tire and battery health and safety analysis and management center. Safe and effective managements of vehicle battery and tire are achieved through analyses and knowledge gained from these analyses. These analyses methods include SPC, root cause and fishbone analyses are applied in the vehicle tire and battery health and safety analysis and management center to improve the operation and health and safety of vehicle tires and batteries.

According to above descriptions, this invention discloses a system for monitoring and managing tires mounted onto a vehicle. The system includes a plurality of tire service stations each includes at least an intelligent tire service station for providing services to the tires mounted onto the vehicle. The intelligent tire service station further comprises a tire diagnostic detector for detecting and storing data of designated tire health management parameters. The intelligent tire service station further comprises a transmitter for transmitting the data of designated tire health management parameters as wireless signals to a networked server in a tire management center wherein the tire management center continuously collects tire health management parameters from the plurality of tire service stations and categorizes the health management parameters into different categories according to a time sequence to perform statistical data analyses on the tire health management parameters collected for detecting an abnormal condition of a tire. In an preferred embodiment, the tire further has a battery health state monitoring sensor implemented as an integrated circuit (IC) chip on the tire for detecting and storing data of tire health state parameters including tire pressure variations, tire strain and stress, and tire thickness and variations of tire thickness. In another embodiment, the tire management center continuously collects the tire health management parameters from the plurality of tire service stations including tire thickness and uniformity of tire thickness of a plurality of tires from a same production lot for detecting the abnormal condition of a tire. In another embodiment, the tire management center continuously collects and analyzes the tire health management parameters from the plurality of tire service stations for detecting the abnormal condition of a tire and the tire management center sends a warning message to a service station or a vehicle driver when the abnormal condition of a tire is detected. In another embodiment, the tire management center continuously collects and analyzes the tire health management parameters from the plurality of tire service stations for detecting the abnormal condition of a tire and the tire management center sends a message to a tire supplier with necessary data of the abnormal condition for resolving technical issues that cause the abnormal condition. In another embodiment, the tire management center continuously collects and analyzes the tire health management parameters from the plurality of tire service stations for maintaining and continuously monitoring conditions of each of the tires and the tire management center sends the tire health management parameters to a tire supplier, a tire manufacturer, an insurance company, a highway safety agency and an automaker as commercially or technically required. In another embodiment, the tire management center continuously collects and analyzes the tire health management parameters from the plurality of tire service stations for maintaining and continuously monitoring conditions of each of the tires and the tire management center applies the tire health management parameters and the conditions of a plurality of the tires to certify and classify the tires into different categories. In another embodiment, each of the tires further includes an RFID as an identity that is electronically identifiable by the intelligent tire service station and the tire management center.

In a preferred embodiment, this invention further discloses an apparatus, that includes one or more network interfaces to communicate within a vehicle-to-Charging-Station (V2CS) network; a processor coupled to the network interfaces and adapted to execute one or more processes; and a memory configured to store a process executable by the processor, the process when executed operable to: collect travel information of a vehicle; determine a profile of the vehicle, the profile indicative of one or more real-time resource requirements of battery charging requirements and health management parameters of the battery; predict a path of the vehicle based on the travel information; determine a next charging station along the predicted path, wherein the next charging station is a stationary node in the V2CS network, along the predicted path that participates with one or more V2CS processes executing on the vehicle; predict a time of arrival of the vehicle to the battery charging station based on the travel information; and inform the designated charging station of the profile of the vehicle and the predicted time of arrival to cause the next charging station to prepare the one or more real-time battery charging and service resources for the vehicle for the predicted time of arrival.

In a preferred embodiment, this invention further discloses a method that includes: collecting, by a prediction agent process in a network, travel information of a vehicle; determining, by the prediction agent process, a profile of the vehicle, the profile indicative of one or more battery charging or tire services resource requirements of the vehicle; predicting, by the prediction agent process, a path of the vehicle based on the travel information; determining, by the prediction agent process, a battery charging station or a tire service station along the predicted path having one or more battery charging and tire service resources corresponding to the one or more real-time resource requirements of the vehicle, wherein the next resource node is a stationary node in the network, along the predicted path that participates with one or more vehicle-to-infrastructure (V2CS) processes executing on the vehicle; predicting, by the prediction agent process, a time of arrival of the vehicle being within range of the next battery charging station or tire service station based on the travel information; and informing, by the prediction agent process, the next battery charging station or tire service station according to the profile of the vehicle and the predicted time of arrival, the informing causing the next battery charging station or tire service station to prepared and be ready for the one or more real-time battery charging or tire service requirements for the vehicle for the predicted time of arrival.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

The invention claimed is:

1. A system for managing rechargeable batteries to provide power to vehicles comprising:
    a battery health state monitoring sensor implemented as an integrated circuit (IC) chip on the rechargeable batteries for detecting and storing data of battery health state parameters on each of the vehicles having a transmitter to transmit the battery health state parameters as wireless signals;
        a battery management center includes a networked server to receive the battery health state parameters transmitted as the wireless signals to continuously collect the battery health management parameters from the plurality of rechargeable batteries;
        the battery management center further categorizes the health management parameters into different categories according to a time sequence to perform statistical data analyses on the battery health management parameters collected for detecting an abnormal condition of a rechargeable battery; and
        the battery health state monitoring sensor implemented as the IC chip on the rechargeable batteries further detecting, storing, and transmitting data of operational environments surrounding the rechargeable battery including temperature and humidity variations, vehicle speed, vehicle acceleration and deceleration, and vehicle impacts.

2. The system of claim 1 wherein:
the battery health state monitoring sensor implemented as the IC chip on the rechargeable batteries further detecting, storing and transmitting data of battery health state parameters including discharge currents (Ad), discharging voltages (Vd), a charge time (Tc), and a discharge time (Td) during the intelligent charger charges the rechargeable batteries.

3. The system of claim 1 wherein:
the battery management center continuously collects and analyzes the battery health management parameters for detecting the abnormal condition of a rechargeable battery and the battery management center sends a warning message to a charge state or a vehicle driver when the abnormal condition of a rechargeable battery is detected.

4. The system of claim 1 wherein:
the battery management center continuously collects and analyzes the battery health management parameters from the plurality of batteries for detecting the abnormal condition of a rechargeable battery and the battery management center sends a message to a battery pack supplier with necessary data of the abnormal condition for resolving technical issues that cause the abnormal condition.

5. The system of claim 1 wherein:
the battery management center continuously collects and analyzes the battery health management parameters from the plurality batteries for maintaining and continuously monitoring conditions of each of the rechargeable batteries and the battery management center sends the battery health management parameters to a battery pack supplier, a battery manufacturer, an insurance company, a highway safety agency and an automaker as commercially or technically required.

6. The system of claim 1 wherein:
the battery management center continuously collects and analyzes the battery health management parameters from the plurality batteries for maintaining and continuously monitoring conditions of each of the rechargeable batteries and the battery management center applies the battery health management parameters and the conditions of a plurality of the rechargeable batteries to certify and classify the rechargeable batteries into different categories.

7. The system of claim 1 further comprising:
a plurality of charging stations each includes at least an intelligent battery charger for charging the rechargeable batteries;
the intelligent battery chargers further comprise a battery diagnostic detector for detecting and storing data of designated battery health management parameters; and
the intelligent tire service station further comprises a transmitter for transmitting the data of designated tire health management parameters as wireless signals to a networked server in a tire management center wherein a tire management center continuously collects tire health management parameters from the plurality of tire service stations and categorizes the health management parameters into different categories according to a time sequence to perform statistical data analyses on the tire health management parameters collected for detecting an abnormal condition of a tire.

8. The system of claim 7 wherein:
at least one of the plurality of charging stations includes at least an ready for immediate replacement battery for replacing one the rechargeable batteries operated on one of the vehicles.

9. A system for managing rechargeable batteries to provide power to vehicles comprising:
    a battery health state monitoring sensor implemented as an integrated circuit (IC) chip on the rechargeable batteries for detecting and storing data of battery health state parameters on each of the vehicles having a transmitter to transmit the battery health state parameters as wireless signals;
        a battery management center includes a networked server to receive the battery health state parameters transmitted as the wireless signals to continuously collect the battery health management parameters from the plurality of rechargeable batteries;
        the battery management center further categorizes the health management parameters into different categories according to a time sequence to perform statistical data analyses on the battery health management parameters collected for detecting an abnormal condition of a rechargeable battery; and the battery management center further receives, stores and analyzes man, machine, manufacture, method and environment (4E1M) parameters from vehicle manufacturers, battery pack assemblers, and battery cell manufacturers, and the battery management center further performs statistical process control methods (SPC) to analyze and correlate the aging and power supply performance to the 4E1M parameters of the rechargeable batteries.

10. The system of claim 9 wherein:

the battery management center further receives, stores, and analyzes performance differences between different battery cells for each of the batteries for correlating the performance differences to the 4M1E parameters among different manufacturing lots and the battery management center further provides relevant data and information with early detection of defective batch predictions to vehicle makers, battery cell makers, battery pack makers for taking corrective and preventive measures.

11. A system for managing rechargeable batteries to provide power to vehicles comprising:

a battery health state monitoring sensor implemented as an integrated circuit (IC) chip on the rechargeable batteries for detecting and storing data of battery health state parameters on each of the vehicles having a transmitter to transmit the battery health state parameters as wireless signals;

a battery management center includes a networked server to receive the battery health state parameters transmitted as the wireless signals to continuously collect the battery health management parameters from the plurality of rechargeable batteries;

the battery management center further categorizes the health management parameters into different categories according to a time sequence to perform statistical data analyses on the battery health management parameters collected for detecting an abnormal condition of a rechargeable battery; and the battery management center further receives, stores and analyzes performance differences between different battery cells for each of the batteries for correlating the performance differences to the 4M1E parameters among different manufacturing lots.

* * * * *